US011087528B1

(12) United States Patent
Couture-Gagnon

(10) Patent No.: US 11,087,528 B1
(45) Date of Patent: Aug. 10, 2021

(54) 3D OBJECT GENERATION

(71) Applicant: Apple Inc., Cupertino, CA (US)

(72) Inventor: Jérôme Couture-Gagnon, Mont-Saint-Hilaire (CA)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/814,677

(22) Filed: Mar. 10, 2020

Related U.S. Application Data

(60) Provisional application No. 62/818,835, filed on Mar. 15, 2019.

(51) Int. Cl.
| | |
|---|---|
| *G06T 15/20* | (2011.01) |
| *G06T 19/00* | (2011.01) |
| *G06F 30/13* | (2020.01) |
| *G06T 15/04* | (2011.01) |

(52) U.S. Cl.
CPC ............ *G06T 15/205* (2013.01); *G06F 30/13* (2020.01); *G06T 15/04* (2013.01); *G06T 19/003* (2013.01)

(58) Field of Classification Search
None
See application file for complete search history.

(56) References Cited

U.S. PATENT DOCUMENTS

| | | | | |
|---|---|---|---|---|
| 6,201,546 | B1* | 3/2001 | Bodor | G06T 15/10 345/420 |
| 7,062,722 | B1* | 6/2006 | Carlin | G06Q 30/02 715/781 |
| 9,098,926 | B2 | 8/2015 | Quan et al. | |
| 9,747,392 | B2* | 8/2017 | Pitzer | G01S 17/86 |
| 10,127,721 | B2 | 11/2018 | Upendran et al. | |
| 2005/0081161 | A1* | 4/2005 | MacInnes | G06K 9/00 715/765 |
| 2008/0187889 | A1* | 8/2008 | Kuhn | G09B 25/04 434/72 |
| 2010/0275018 | A1* | 10/2010 | Pedersen | G06F 30/13 713/168 |
| 2010/0321391 | A1* | 12/2010 | Rubin | G06T 3/40 345/441 |
| 2013/0147799 | A1* | 6/2013 | Hoguet | G06T 17/00 345/420 |
| 2014/0267717 | A1* | 9/2014 | Pitzer | G01S 7/481 348/143 |
| 2017/0084077 | A1 | 3/2017 | Liu et al. | |
| 2020/0242849 | A1* | 7/2020 | Cini | G06T 19/20 |

FOREIGN PATENT DOCUMENTS

WO    2016/000019 A1    1/2016

* cited by examiner

*Primary Examiner* — Edward Martello
(74) *Attorney, Agent, or Firm* — Fernando & Partners, LLP

(57) ABSTRACT

In one implementation, a method of generating a three-dimensional object is performed by a device including one or more processors, non-transitory memory, one or more input devices, and a display. The method includes detecting a first set of one or more user inputs indicative of a two-dimensional profile and detecting a second set of one or more user inputs indicative of a two-dimensional floor plan. The method includes generating, based on the two-dimensional profile and the two-dimensional floor plan, a three-dimensional object and displaying the three-dimensional object.

20 Claims, 27 Drawing Sheets

3D OBJECT GENERATION

CROSS-REFERENCE TO RELATED APPLICATIONS

The application claims priority to U.S. Provisional Patent App. No. 62/818,835, filed on Mar. 15, 2019, which is hereby incorporated by reference in its entirety.

TECHNICAL FIELD

The present disclosure generally relates to generating a three-dimensional object and, in particular, to systems, methods, and devices for presenting a graphical user interface for generating a three-dimensional object based on a two-dimensional profile and a two-dimensional floor plan.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a CGR environment includes one or more real objects and one or more virtual objects. In various implementations, a virtual object is rendered at a distance that places the virtual object behind a real object without being occluded by the real object. This creates a focal conflict in which the user sees the virtual object and gets depth cues as if the virtual object were further than the real object and, thus, should be occluded by the physical object, but is not. It may be desirable to effectively resolve this focal conflict.

Generating three-dimensional objects for a CGR environment can be a time-consuming process. In various implementations, computer-aided design (CAD) software is used to generate three-dimensional objects. However, in various circumstances, such software is cumbersome and counter-intuitive, requiring experience and/or specialized training to design and/or modify three-dimensional objects. Accordingly, in various implementations described herein, a graphical user interface (GUI) is presented that allows a user to efficiently generate three-dimensional objects based on a two-dimensional profile and a two-dimension floor plan.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
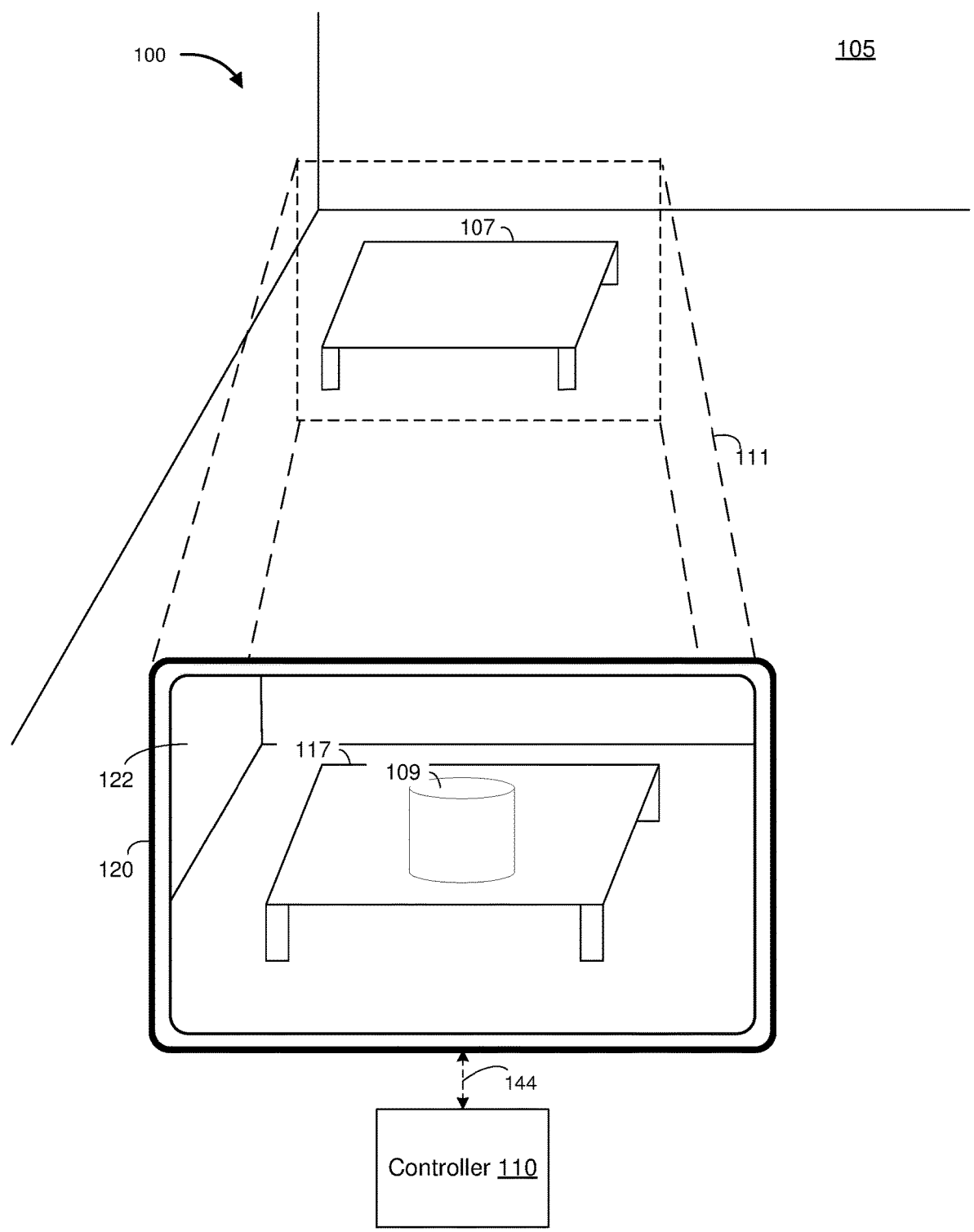
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating a three-dimensional object. In various implementations, a method is performed by a device including one or more processors, non-transitory memory, one or more input devices, and a display. The method includes detecting a first set of one or more user inputs indicative of a two-dimensional profile and detecting a second set of one or more user inputs indicative of a two-dimensional floor plan. The method includes generating, based on the two-dimensional profile and the two-dimensional floor plan, a three-dimensional object and displaying the three-dimensional object.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A graphical user interface (GUI) is presented that allows a user to, via a first user input, indicate a two-dimensional floor plan and, via a second user input, indicate a two-dimensional profile. In various implementations, without further user interaction, the GUI displays a three-dimensional object based on the two-dimensional floor plan and the two-dimensional profile. The three-dimensional object can be saved and used in a CGR environment.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate a CGR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the CGR experience to the user. In some implementations, the electronic device 120 includes a suitable combination of software, firmware, and/or hardware. According to some implementations, the electronic device 120 presents, via a display 122, CGR content to the user while the user is physically present within the scene 105 that includes a table 107 within the field-of-view 111 of the electronic device 120. As such, in some implementations, the user holds the electronic device 120 in his/her hand(s). In some implementations, while providing augmented reality (AR) content, the electronic device 120 is configured to display an AR object (e.g., an AR cylinder 109) and to enable video pass-through of the scene 105 (e.g., including a representation 117 of the table 107) on a display 122. The electronic device 120 is described in greater detail below with respect to FIG. 3.

According to some implementations, the electronic device 120 provides a CGR experience to the user while the user is virtually and/or physically present within the scene 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more CGR displays provided to display the CGR content. For example, in various implementations, the electronic device 120 encloses the field-of-view of the user. In some implementations, the electronic device 120 is a handheld device (such as a smartphone or tablet) configured to present CGR content, and rather than wearing the electronic device 120, the user holds the device with a display directed towards the field-of-view of the user and a camera directed towards the scene 105. In some implementations, the handheld device can be placed within an enclosure that can be worn on the head of the user. In some implementations, the electronic device 120 is replaced with a CGR chamber, enclosure, or room configured to present CGR content in which the user does not wear or hold the electronic device 120.

Figure 2:
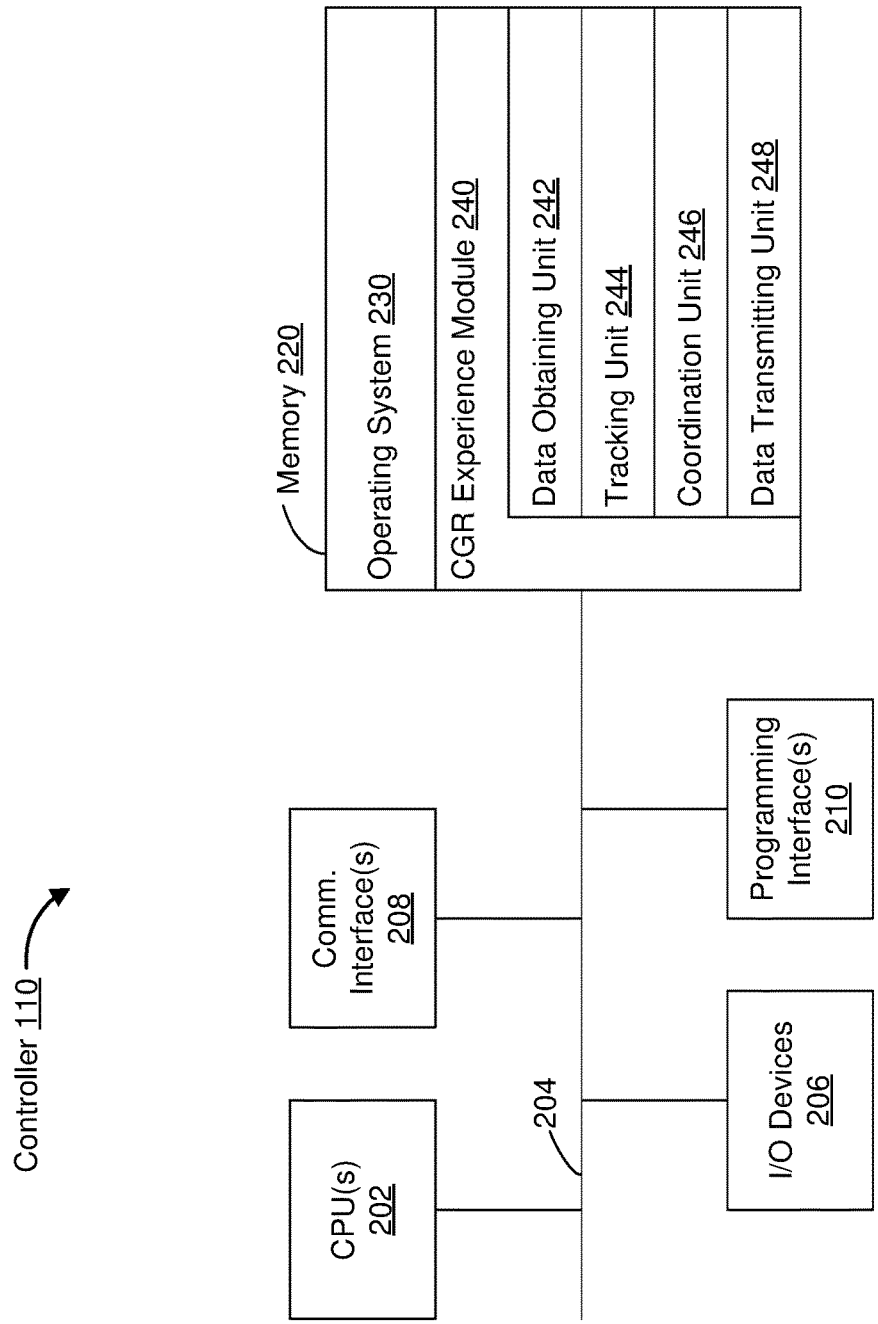
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some implementations, the CGR experience module 240 is configured to manage and coordinate one or more CGR experiences for one or more users (e.g., a single CGR experience for one or more users, or multiple CGR experiences for respective groups of one or more users). To that end, in various implementations, the CGR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the scene 105 and to track the position/location of at least the electronic device 120 with respect to the scene 105 of FIG. 1. To that end, in various implementations, the tracking unit 244 includes instructions and/or logic therefor, and heuristics and metadata therefor.

In some implementations, the coordination unit 246 is configured to manage and coordinate the CGR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
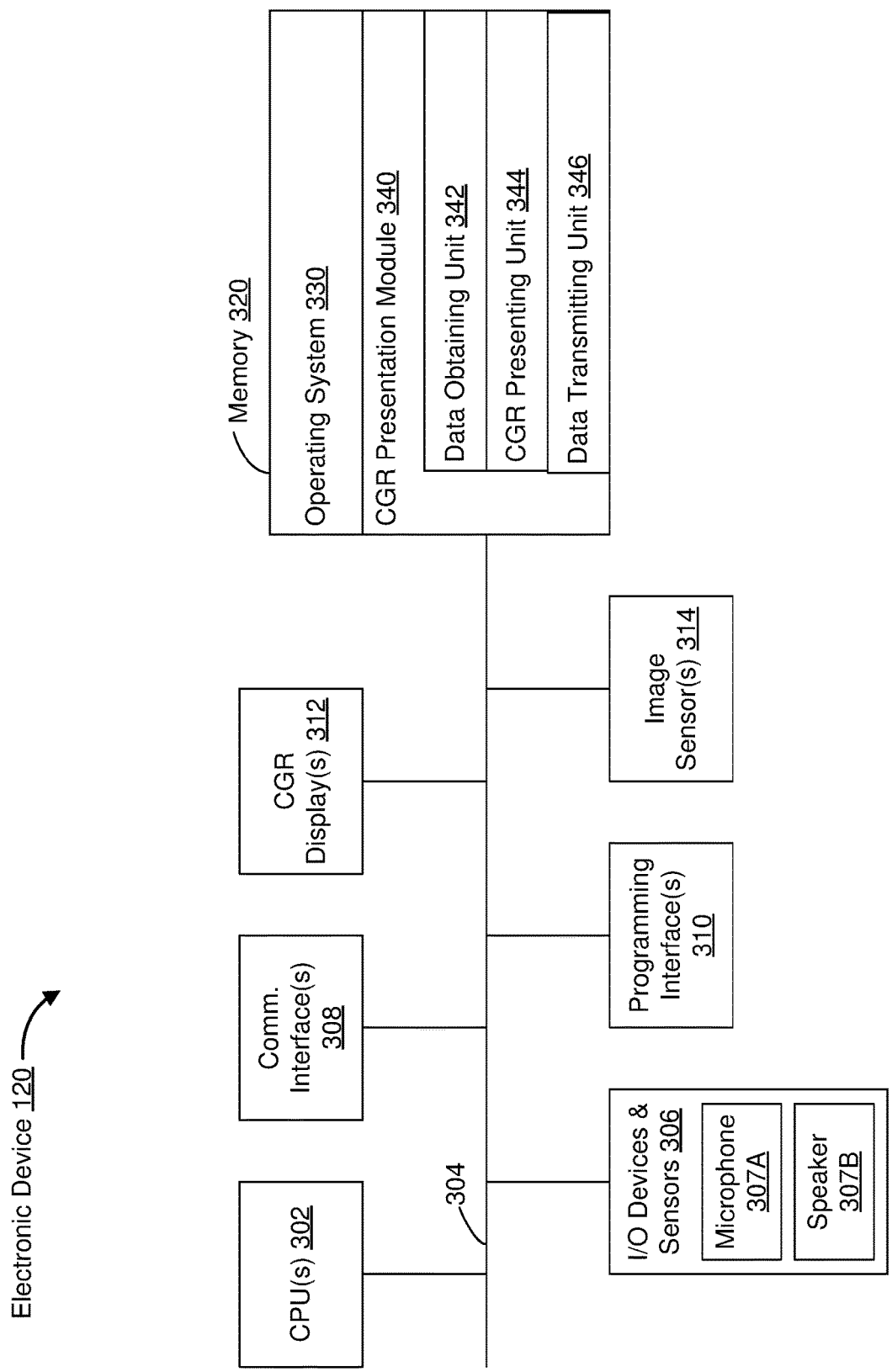
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones 307A, one or more speakers 307B, a haptics engine, one or more depth sensors (e.g., a structured light, a time-of-flight, or the like), and/or the like.

In some implementations, the one or more CGR displays 312 are configured to provide the CGR experience to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the electronic device 120 includes a single CGR display. In another example, the electronic device 120 includes a CGR display for each eye of the user.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312. To that end, in various implementations, the CGR presentation module 340 includes a data obtaining unit 342, a CGR presenting unit 344, and a data transmitting unit 346.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the CGR presenting unit 344 is configured to present CGR content via the one or more CGR displays 312. In various implementations, the CGR content includes at least one three-dimensional object generated based on a two-dimensional profile and a two-dimensional floor plan. To that end, in various implementations, the CGR presenting unit 344 includes instructions and/or logic therefor, and heuristics and metadata therefor.

In some implementations, the data transmitting unit 346 is configured to transmit data (e.g., presentation data, location data, etc.) to at least the controller 110. To that end, in various implementations, the data transmitting unit 346 includes instructions and/or logic therefor, and heuristics and metadata therefor.

Although the data obtaining unit 342, the CGR presenting unit 344, and the data transmitting unit 346 are shown as residing on a single device (e.g., the electronic device 120 of FIG. 1), it should be understood that in other implementations, any combination of the data obtaining unit 342, the CGR presenting unit 344, and the data transmitting unit 346 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
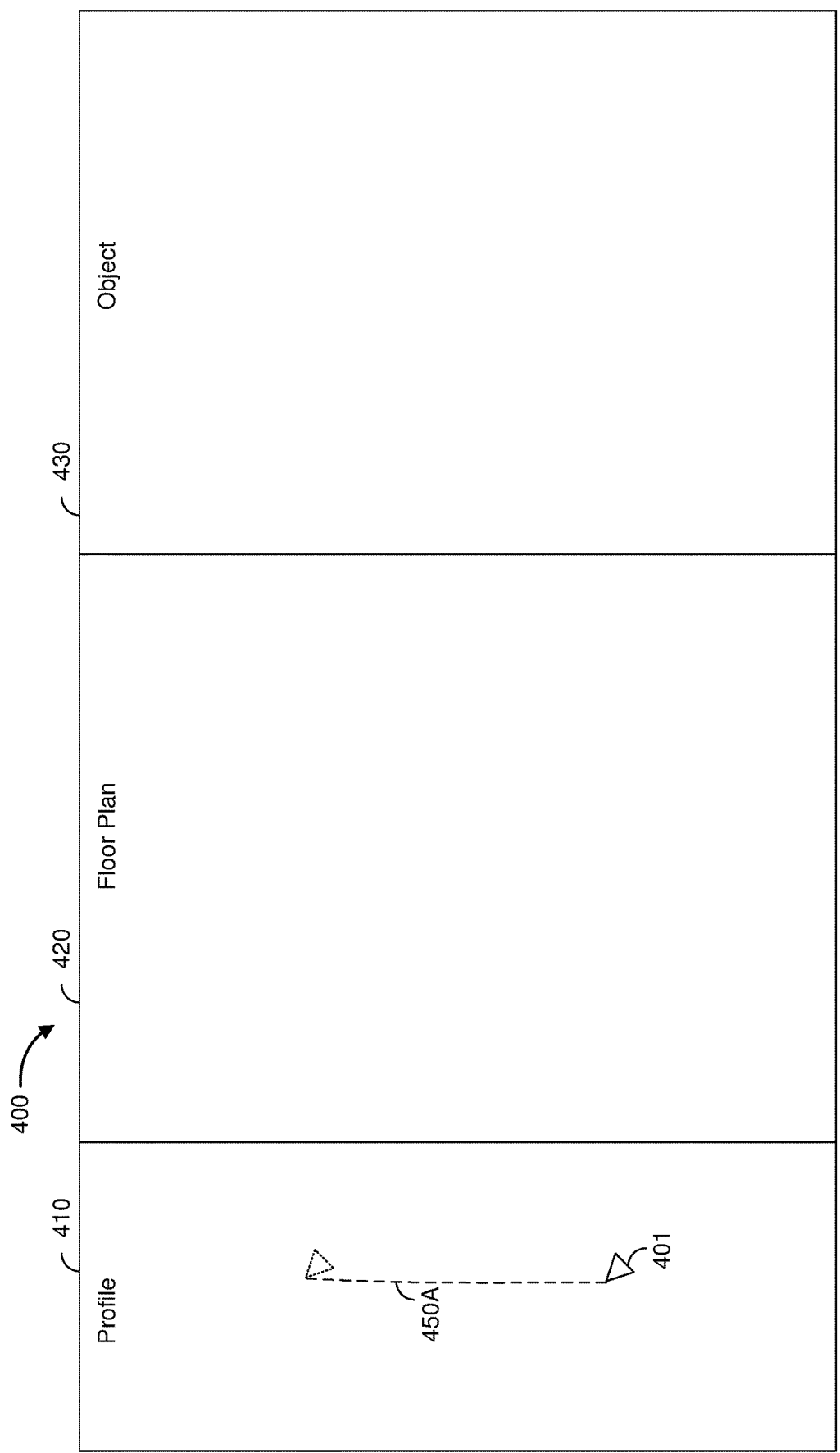
FIGS. 4A-4U illustrate a graphical user interface (GUI) for generating a three-dimensional object based on a two-dimensional profile and a two-dimensional floor plan in accordance with some implementations.

FIG. 4A illustrates an example graphical user interface (GUI) for generating a three-dimensional object. The GUI 400 includes a profile portion 410 for receiving user input indicative of a two-dimensional profile. The GUI 400 includes a floor plan portion 420 for receiving user input indicative of a two-dimensional floor plan. The GUI 400 includes an object portion 430 for displaying a three-dimensional object based on the two-dimensional profile and the two-dimensional floor plan.

FIG. 4A illustrates a cursor 401 providing a first user input 450A indicative of a motion in a generally downward direction from a first location in the profile portion 410 to a second location in the profile portion 410. In various implementations, the first user input 450A is input by a user depressing a mouse button, moving the mouse in a downward direction, and releasing the mouse button. In various implementations, the first user input 450A is input by dragging a finger (or stylus) from the first location to the second location on a touch-sensitive surface displaying the GUI 400. In various implementations, the first user input 450A is input by moving a finger in a CGR environment from the first location to the second location.

Figure 4B:
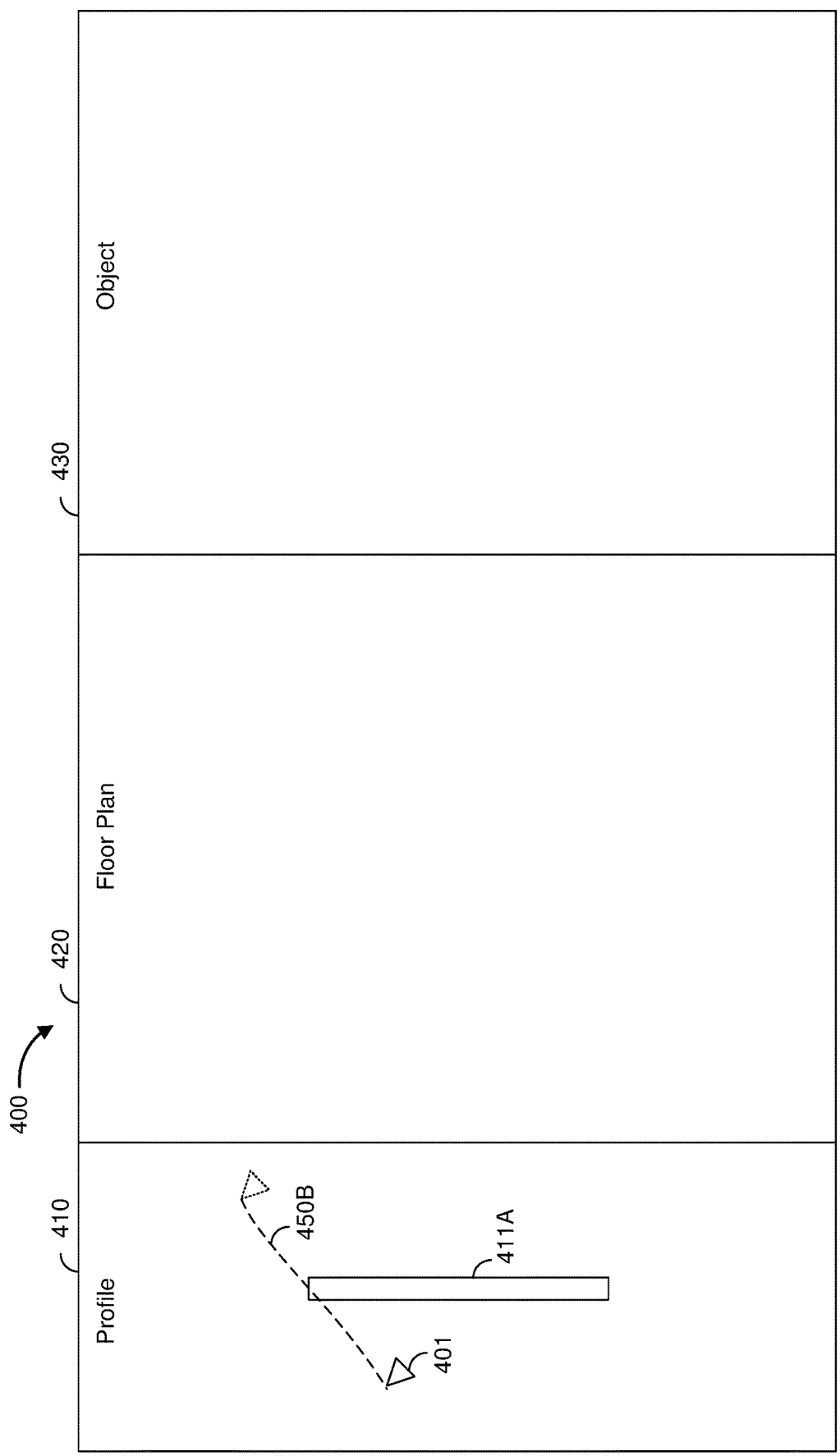

FIG. 4B illustrates the GUI 400 of FIG. 4A in response to detecting the first user input 450A. In response to detecting the first user input 450A, the profile portion 410 includes a first segment 411A. In various implementations, although the first user input 450A was not exactly vertical, the first segment 411A is vertical. The length of the first segment 411A is proportional to the distance between the first location to the second location of the first user input 450A.

FIG. 4B illustrates the cursor 401 providing a second user input 450B indicative of a motion in an angled direction from a first location in the profile portion 410 to a second location in the profile portion 410. In various implementations, the second user input 450B is input by a user depressing a mouse button, moving the mouse in an angled direction, and releasing the mouse button. In various implementations, the second user input 450B is input by dragging a finger (or stylus) from the first location to the second location on a touch-sensitive surface displaying the GUI 400. In various implementations, the second user input 450B is input by moving a finger in a CGR environment from the first location to the second location.

Figure 4C:
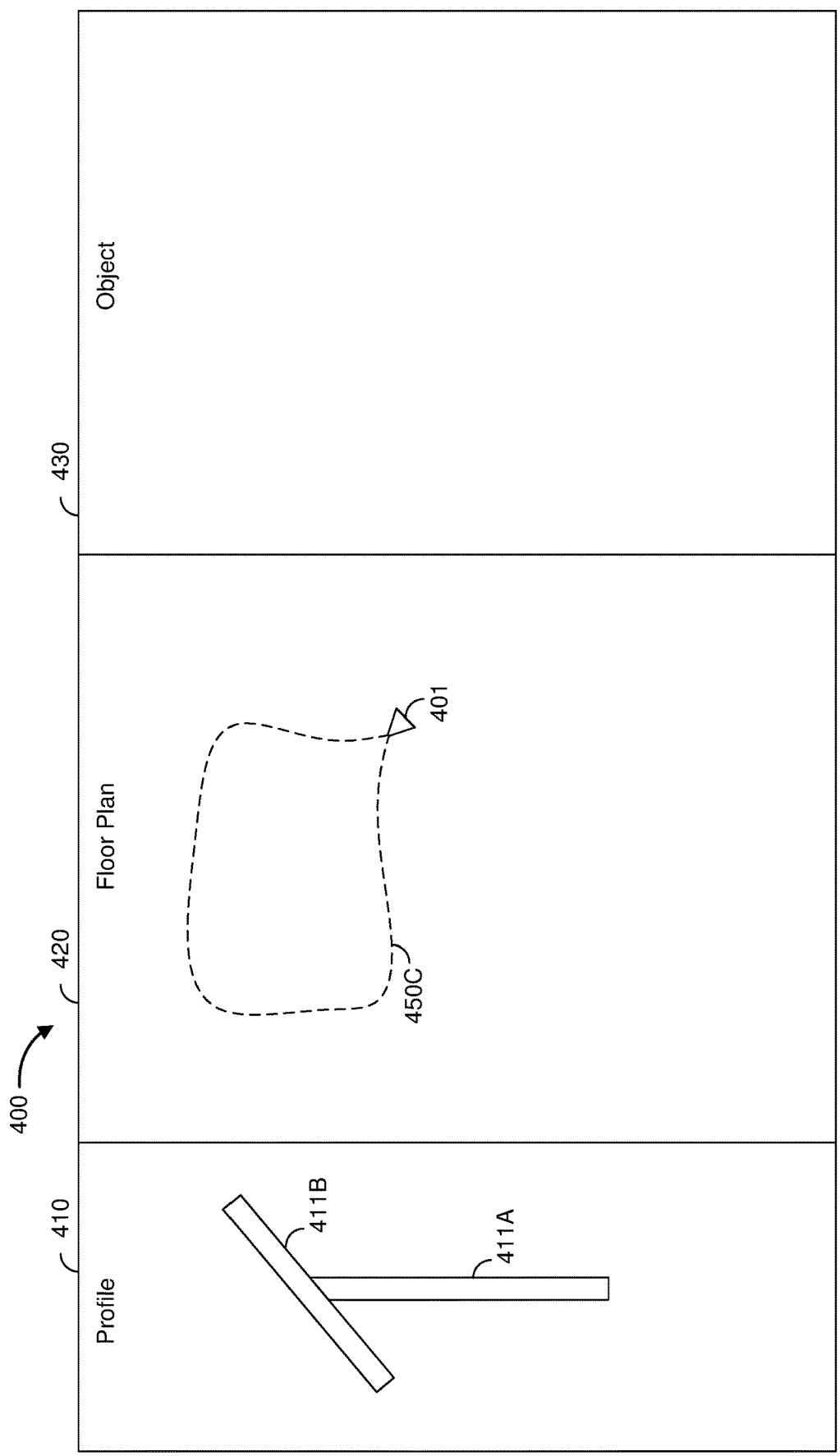

FIG. 4C illustrates the GUI 400 of FIG. 4B in response to detecting the second user input 450B. In response to detecting the first user input 450B, the profile portion 410 includes a second segment 411B intersecting the first segment 411A at an angle. The length of the second segment 411B is proportional to the distance between the first location and the second location of the second user input 450B.

FIG. 4C illustrates the cursor 401 providing a third user input 450C indicative of a generally rectangular shape in the floor plan portion 420. In various implementations, the third user input 450C is input by a user depressing a mouse button, moving the mouse to define a generally rectangular shape, and releasing the mouse button. In various implementations, the third user input 450C is input by dragging a finger (or stylus) to define a generally rectangular shape on a touch-sensitive surface displaying the GUI 400. In various implementations, the third user input 450C is input by moving a finger in a CGR environment to define a generally rectangular shape.

In various implementations, the third user input 450C inserting a rectangular shape into the floor plan portion 420 includes performing a drag-and-drop of a rectangular shape from a shapes menu (not shown) to a location in the floor plan portion 420.

Figure 4D:
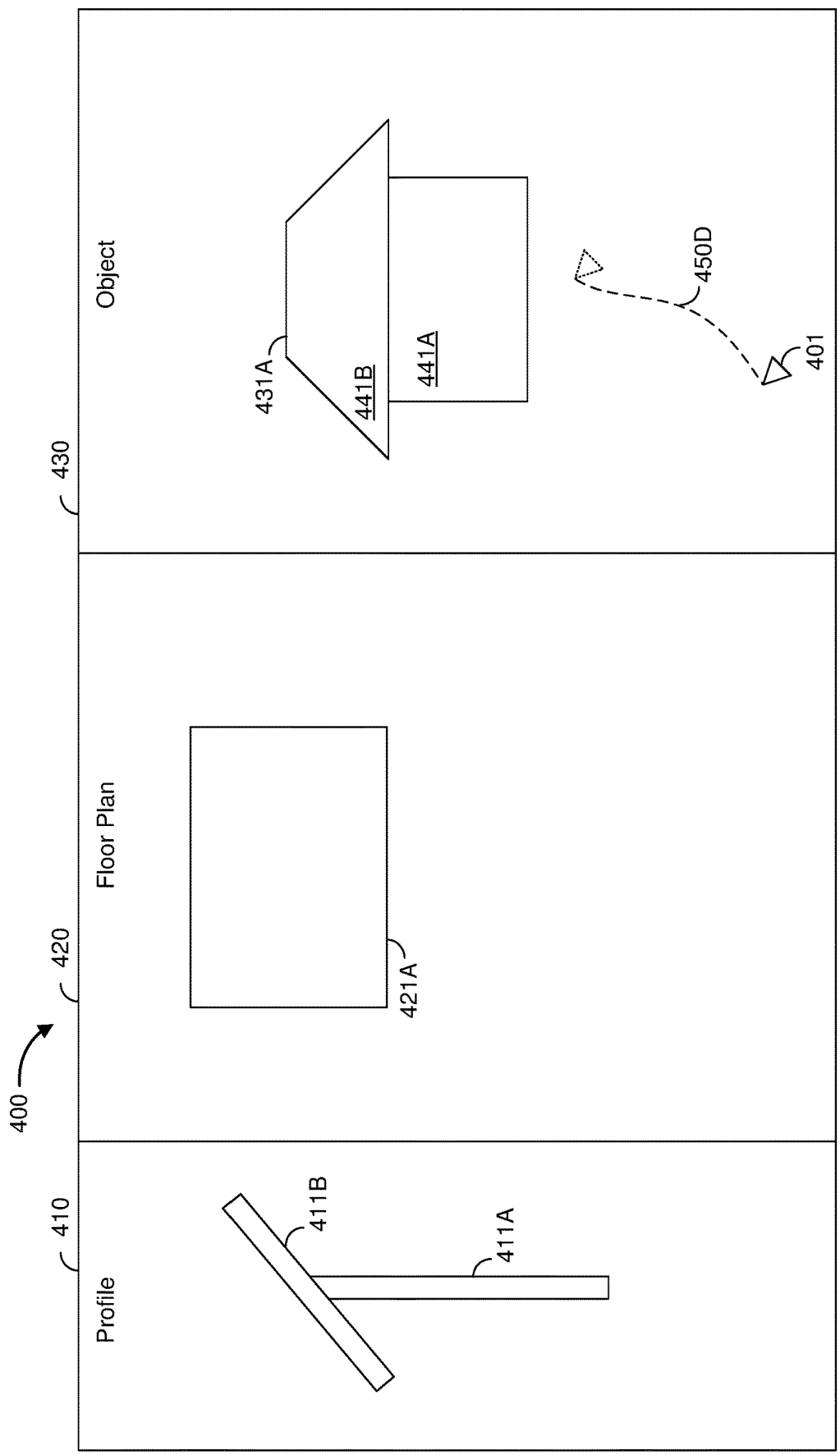

FIG. 4D illustrates the GUI 400 of FIG. 4C in response to detecting the third user input 450C. In response to detecting the third user input 450C, the floor plan portion 420 includes a first shape 421A. In various implementations, although the third user input 450C was not exactly rectangular, the first shape 421A is a rectangle based on the third user input 450C.

In response to detecting the third user input 450C, the object portion 430 includes a first three-dimensional object 431A generated based on the two-dimensional profile in the profile portion 410 defined by the first segment 411A and the second segment 411B and the two-dimensional floor plan in the floor plan portion 420 defined by the first shape 421A.

The first three-dimensional object 431A includes a first portion 441A corresponding to the first segment 411A of the two-dimensional profile and the first shape 421A of the floor plan and also includes a second portion 441B corresponding to the second segment 411B of the two-dimensional profile and the first shape 421A of the floor plan.

Thus, the first portion 441A includes vertical walls (corresponding to the vertical first segment 411A of the profile) with a rectangular footprint (corresponding to the rectangular first shape 421A of the floor plan). Similarly, the second portion 441A includes an angled roof (corresponding to the angled second segment 411B of the profile) atop the vertical walls (corresponding to the rectangular first shape 421A of the floor plan).

FIG. 4D illustrates the cursor 401 providing a fourth user input 450D changing a view of the object portion 430. In various implementations, the fourth user input 450D is input by a user depressing a mouse button, moving the mouse from a first location in the object portion 430 to a second location in the object portion 430, and releasing the mouse button. In various implementations, the fourth user input 450B is input by dragging a finger (or stylus) within the object portion 430 on a touch-sensitive surface displaying the GUI 400. In various implementations, the fourth user input 450D is input in a CGR environment with a gesture grabbing and moving the first three-dimensional object 431A.

In various implementations, the fourth user input 450D includes interacting with a view affordance (not shown) displayed in the GUI 400, e.g., in the object portion 430.

Figure 4E:
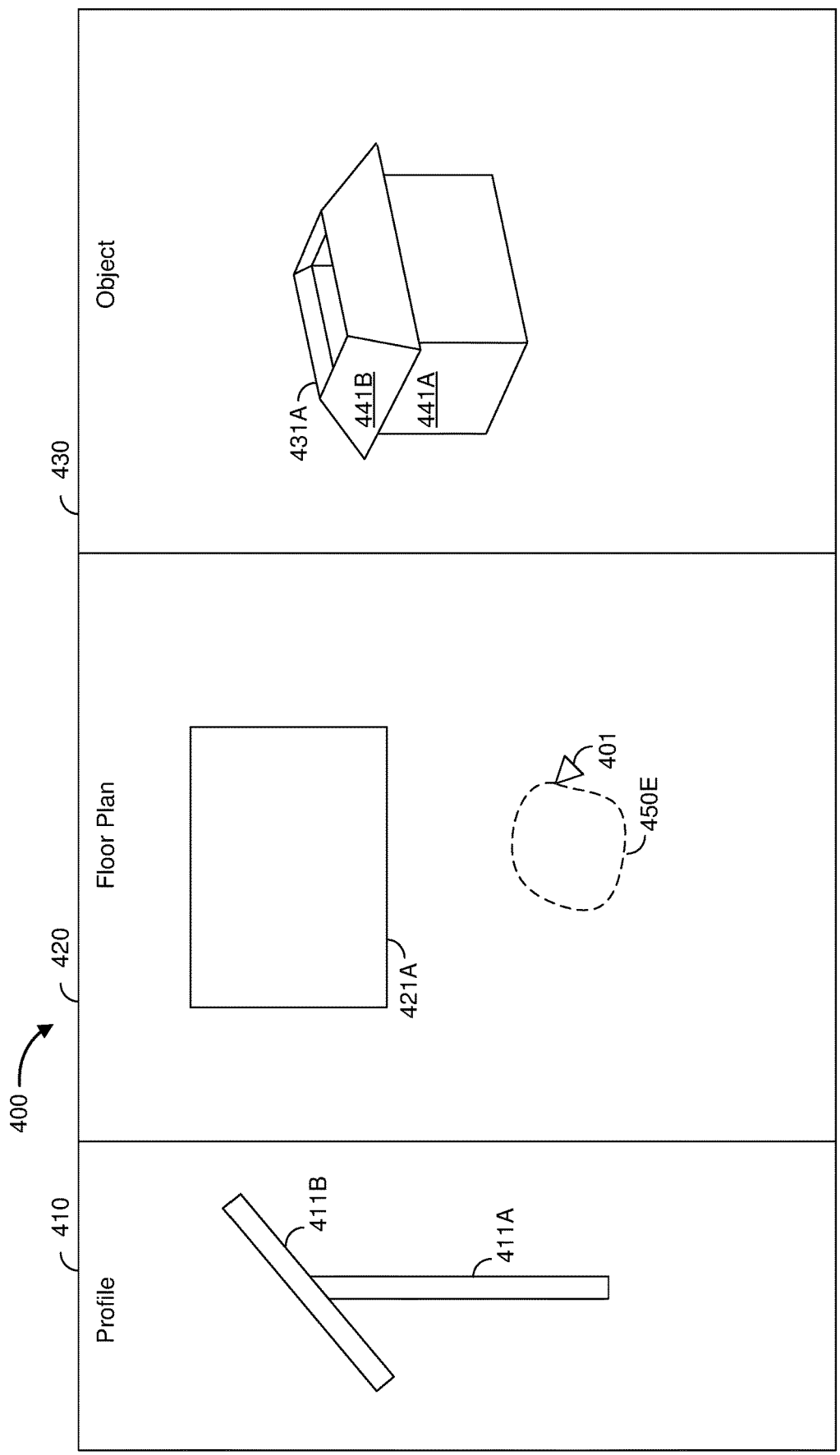

FIG. 4E illustrates the GUI 400 of FIG. 4D in response to detecting the fourth user input 450D. In response to detecting the fourth user input 450D, the view perspective of the object portion 430 is changed, displaying the first three-dimensional object 431A from a different angle.

FIG. 4E illustrates the cursor 401 providing a fifth user input 450E indicative of a generally circular shape in the floor plan portion 420. In various implementations, the fifth user input 450E is input by a user depressing a mouse button, moving the mouse to define a generally circular shape, and releasing the mouse button. In various implementations, the fifth user input 450E is input by dragging a finger (or stylus) to define a generally circular shape on a touch-sensitive surface displaying the GUI 400. In various implementations, the fifth user input 450E is input by moving a finger in a CGR environment to define a generally circular shape.

In various implementations, the fifth user input 450E inserting a circular shape into the floor plan portion 420 includes performing a drag-and-drop of a circular shape from a shapes menu (not shown) to a location in the floor plan portion 420.

Figure 4F:
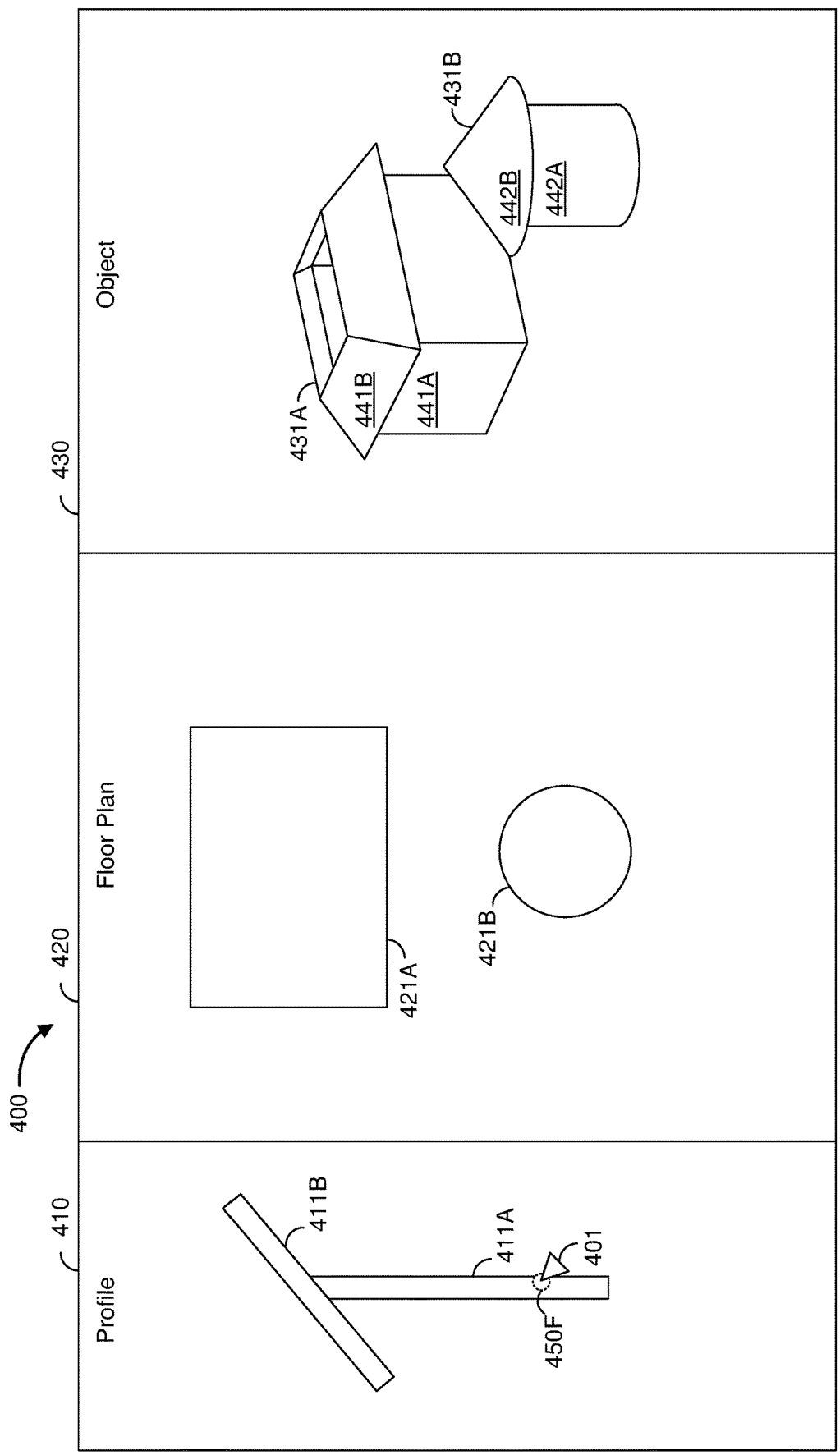

FIG. 4F illustrates the GUI 400 of FIG. 4E in response to detecting the fifth user input 450E. In response to detecting the fifth user input 450E, the floor plan portion 420 includes a second shape 421B. In various implementations, although the fifth user input 450E was not exactly circular, the second shape 421B is a circle based on the fifth user input 450E.

In response to detecting the fifth user input 450C, the object portion 430 includes the first three-dimensional object 431A and a second three-dimensional object 431B generated based on the two-dimensional profile in the profile portion 410 defined by the first segment 411A and the second segment 411B and the two-dimensional floor plan in the floor plan portion 420 defined by the first shape 421A and the second shape 421B.

The second three-dimensional object 431B includes a first portion 442A corresponding to the first segment 411A of the two-dimensional profile and the second shape 421B of the floor plan and also includes a second portion 442B corresponding to the second segment 411B of the two-dimensional profile and the second shape 421B of the floor plan.

Thus, the first portion 442A includes vertical walls (corresponding to the vertical first segment 411A of the profile) with a circular footprint (corresponding to the circular second shape 421B of the floor plan). Similarly, the second portion 442A includes an angled roof (corresponding to the angled second segment 411B of the profile) atop the vertical walls (corresponding to the circular second shape 421B of the floor plan).

FIG. 4F illustrates the cursor 401 providing a sixth user input 450F indicative of selection of the first segment 411A in the profile portion 410. In various implementations, the sixth user input 450F is input by a user clicking a mouse button while the cursor 401 is located at the first segment 411A. In various implementations, the sixth user input 450F is input by tapping a finger (or stylus) on a touch-sensitive surface where the first segment 411A is displayed. In various implementations, the sixth user input 450F is input by gesturing at the first segment 411A in a CGR environment.

Figure 4G:
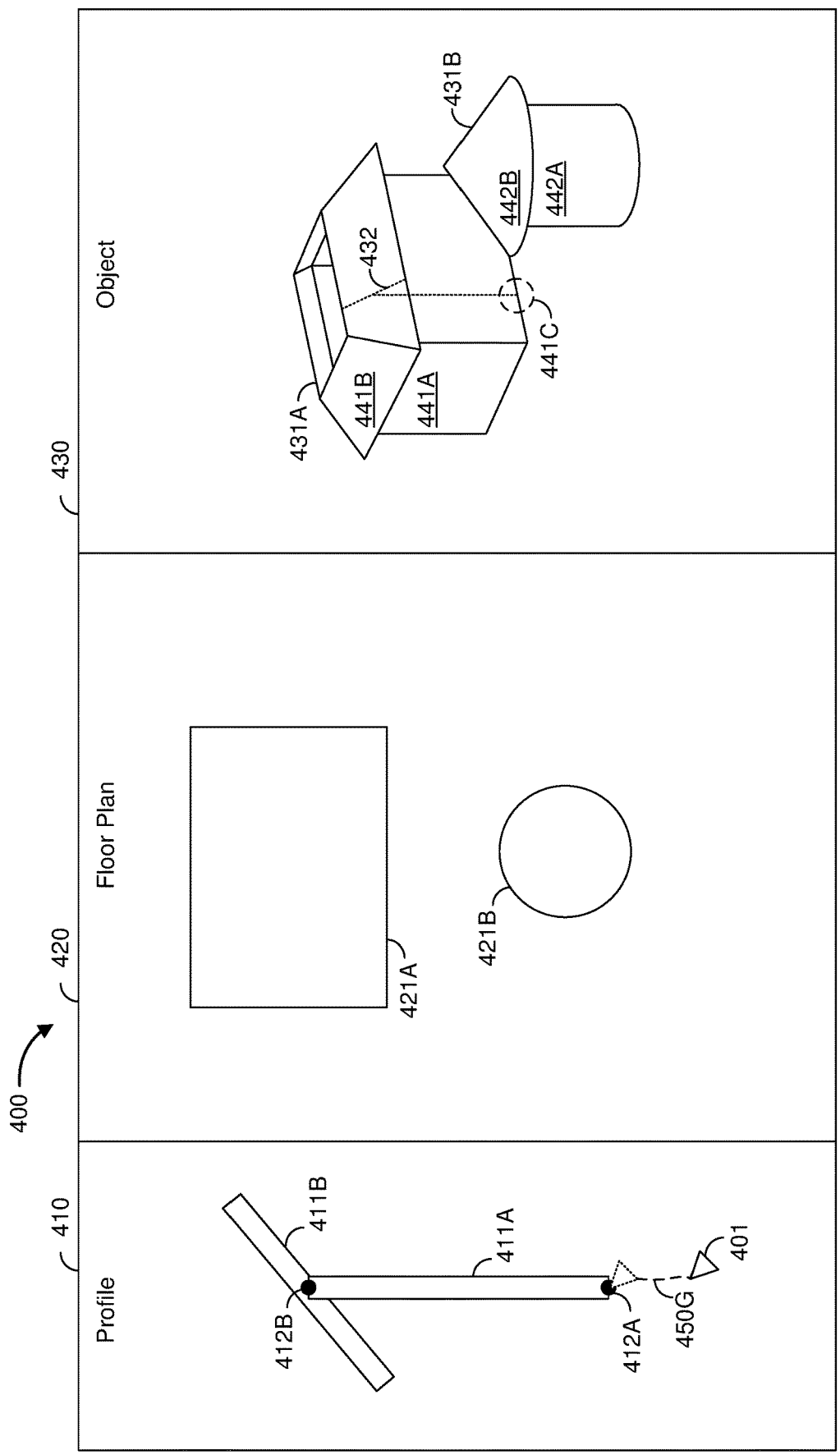

FIG. 4G illustrates the GUI 400 of FIG. 4F in response to detecting the sixth user input 450F. In response to detecting the sixth user input 450F, the first segment 411A is displayed with selection indicia 412A-412B at either end of the first segment 411A. The selection indicia 412A-412B indicate that the first segment 411A is selected.

FIG. 4G illustrates the cursor 401 providing a seventh user input 450G indicative of a resizing of the first segment 411A. In various implementations, the seventh user input 450G is input by a user depressing a mouse button while the cursor 401 is located at the selection indicia 412A, moving the mouse, and releasing the mouse button. In various implementations, the seventh user input 450G is input by dragging a finger (or stylus) on a touch-sensitive surface from the location of the selection indicia to another location. In various implementations, the seventh user input 450G is input by a gesture in which the user grabs the end of the first segment 411A, moves the end of the first segment 411A, and releases the first segment 411A.

In various implementations, the profile is changed in a CGR environment by interaction with the object portion, e.g., with the first three-dimensional object 431A or the second three-dimensional object 431B. For example, in various implementations, to resize the first segment 411A, a user performs a gesture grabbing the edge of the first three-dimensional object 431A (indicated by the circle 441C) and dragging the edge downward. As another example, in various implementations, to modify the second segment 411B, a user performs a gesture pulling or pushing the edge of the second portion 441B of the three-dimensional object 431A upward or downward.

In various implementations, to facilitate manipulation of the profile via interaction with the three-dimensional object 431C, the profile is displayed as an overlay 432 over the side of the three-dimensional object 431C.

In various implementations, the profile is changed by a user input interacting with a slider or other affordance to change parameters of the profile, such as "wall height" to increase the length of the first segment 411A, "overhang size" to increase the length of the second segment 411B, "roof angle" to change the angle at which the first segment 411A and second segment 411B meet, etc.

Figure 4H:
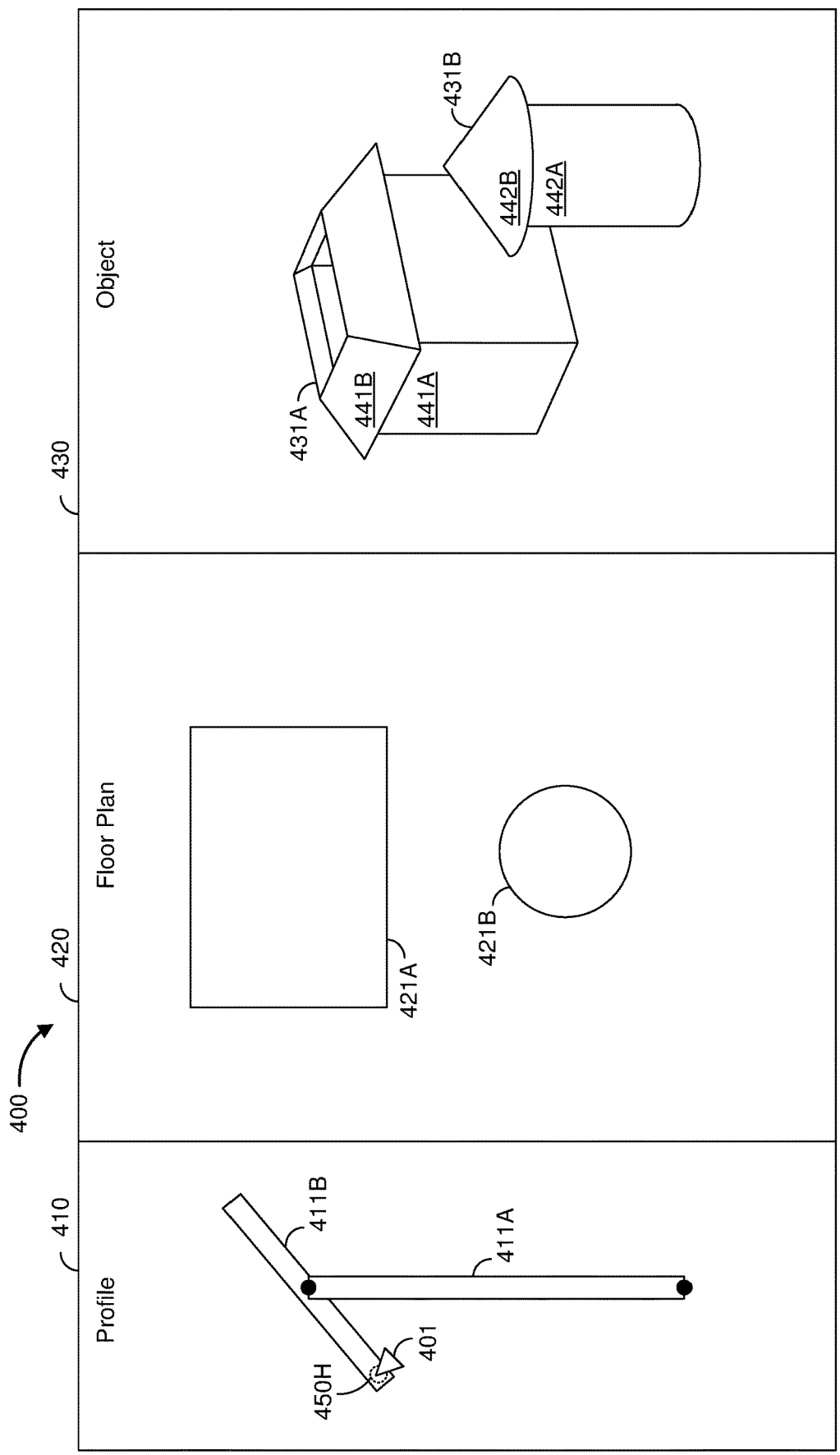

FIG. 4H illustrates the GUI 400 of FIG. 4G in response to detecting the seventh user input 450G. In response to detecting the seventh user input 450G, the length of the first segment 411A in the profile portion 410 is increased. Further, in response to the profile defined by the first segment 411A and second segment 411B changing (by virtue of the increased length of the first segment 411A), the first three-dimensional object 431A and the second three-dimensional object 431B are also changed. In particular, the first portion 441A of the first three-dimensional object 431A and the first portion 442A of the second three-dimensional object 431B are increased in height.

FIG. 4H illustrates the cursor 401 providing an eighth user input 450H indicative of a request to interact with the second segment 411B. In various implementations, the eighth user input 450H is input by a user clicking an alternative mouse button (e.g., a "right click") while the cursor 401 is located at second segment 411B. In various implementations, the eighth user input 450H is input by a user clicking a mouse button for at least a threshold amount of time. In various implementations, the eighth user input 450H is input by touching a finger (or stylus) to a touch-sensitive surface at the location of the selection indicia for at least a threshold amount of time (e.g., a "long press") or with at least a threshold amount of pressure (e.g., a "hard press"). In various implementations, the eighth user input 450H is input by a gesture in which the user indicates the second segment 411B for at least a threshold amount of time.

Figure 4I:
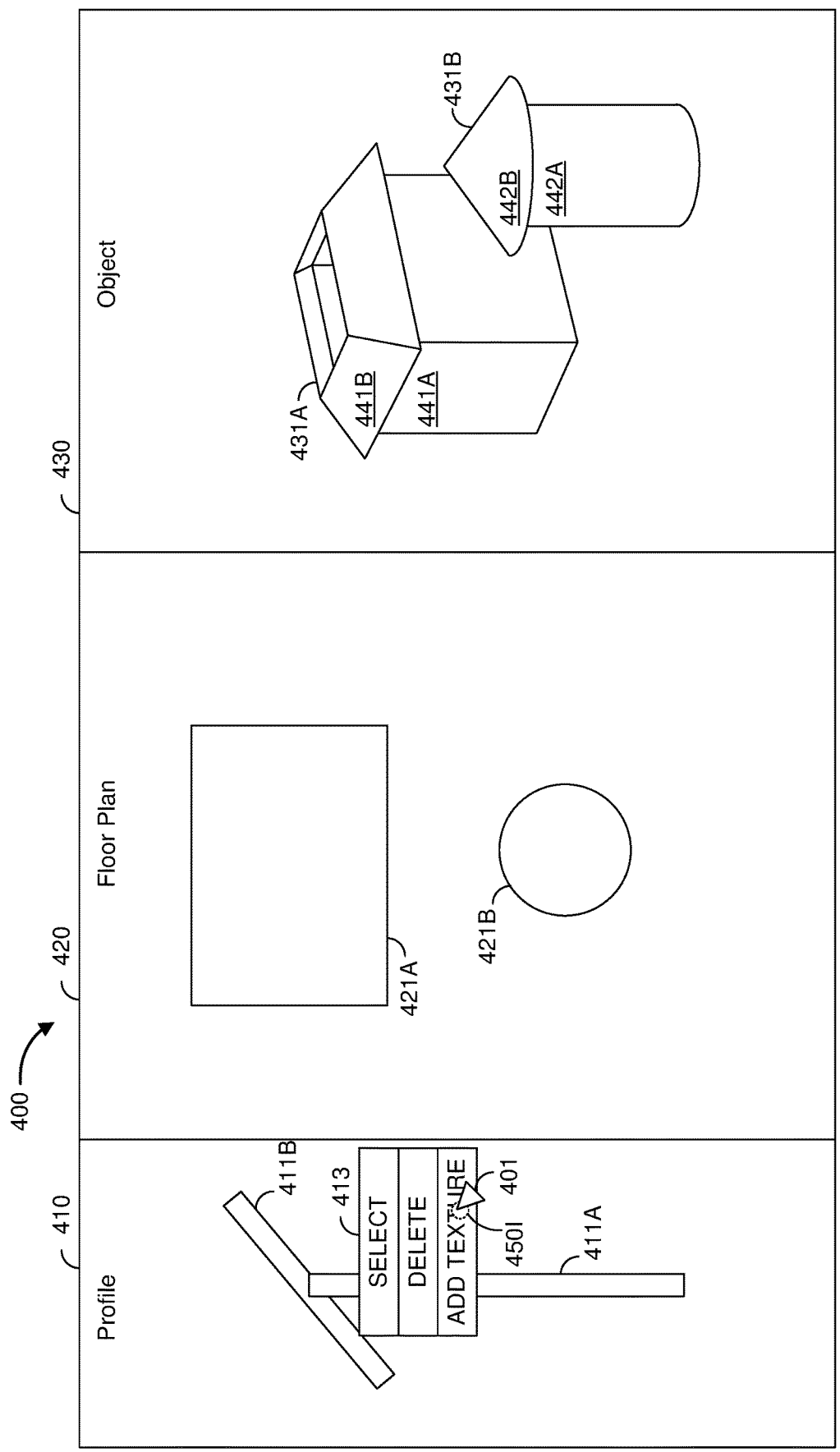

FIG. 4I illustrates the GUI 400 of FIG. 4H in response to detecting the eighth user input 450H. In response to detecting the eighth user input 450H, the GUI 400 includes a segment menu 413 with a number of affordances for interacting with the second segment 411B. In various implementations (and as illustrated in FIG. 4I), the segment menu 413 includes a select affordance for selecting the second segment 411B (and, thereby displaying selection indicia with respect to the second segment 411B), a delete affordance for deleting the second segment 411B, and an add-texture affordance for adding a texture to the second segment 411B as described below.

FIG. 4I illustrates the cursor 401 providing a ninth user input 450I indicative of a selection of the add-texture affordance. In various implementations, the ninth user input 450I is input by a user clicking a mouse button while the cursor 401 is located at the add-texture affordance. In various implementations, the ninth user input 450I is input by tapping a finger (or stylus) on a touch-sensitive surface where the add-texture affordance is displayed. In various implementations, the ninth user input 450I is input by gesturing to indicate the add-texture affordance in a CGR environment. For example, in various implementations, the ninth user input 450I includes performing a gesture while the add-texture affordance is selected and/or highlighted.

Figure 4J:
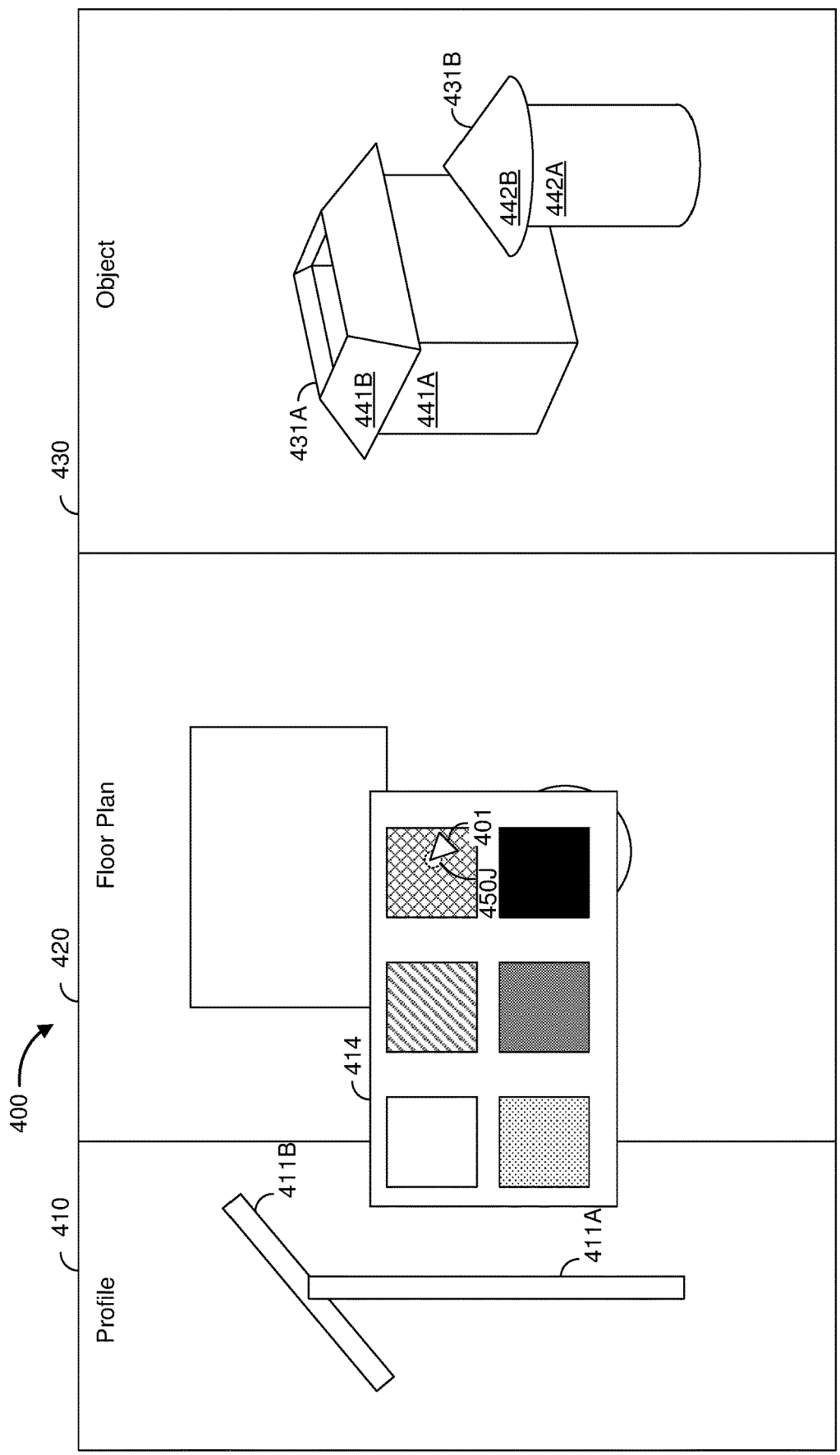

FIG. 4J illustrates the GUI 400 of FIG. 4I in response to detecting the ninth user input 450I. In FIG. 4J, the segment menu 413 is replaced with a texture menu 414 including a plurality of texture affordances associated with respective textures.

FIG. 4J illustrates the cursor 401 providing a tenth user input 450J indicative of selection of a particular texture affordance of the texture menu 414. In various implementations, the tenth user input 450J is input by a user clicking a mouse button while the cursor 401 is located at the particular affordance. In various implementations, the tenth user input 450J is input by tapping a finger (or stylus) on a touch-sensitive surface where the particular texture affordance is displayed. In various implementations, the tenth user input 450J is input by gesturing to indicate the particular texture affordance in a CGR environment. For example, in various implementations, the tenth user input 450J includes performing a gesture while the particular texture affordance is selected and/or highlighted.

Although FIGS. 4H-4J illustrate user input to assign a texture to a particular segment, in various implementations, the user input to assign a texture to a particular segment includes performing a drag-and-drop of a representation of the texture from a texture menu to a location of the particular segment.

In various implementations, assigning a texture to a particular segment includes performing a drag-and-drop of a representation of the texture from a texture menu to a location on the three-dimensional object 431A in the object portion 430. For example, by dragging a representation of the texture to a location in the object portion corresponding to the second portion 441B of the three-dimensional object 431A, the corresponding second segment 411B is assigned the texture.

Figure 4K:
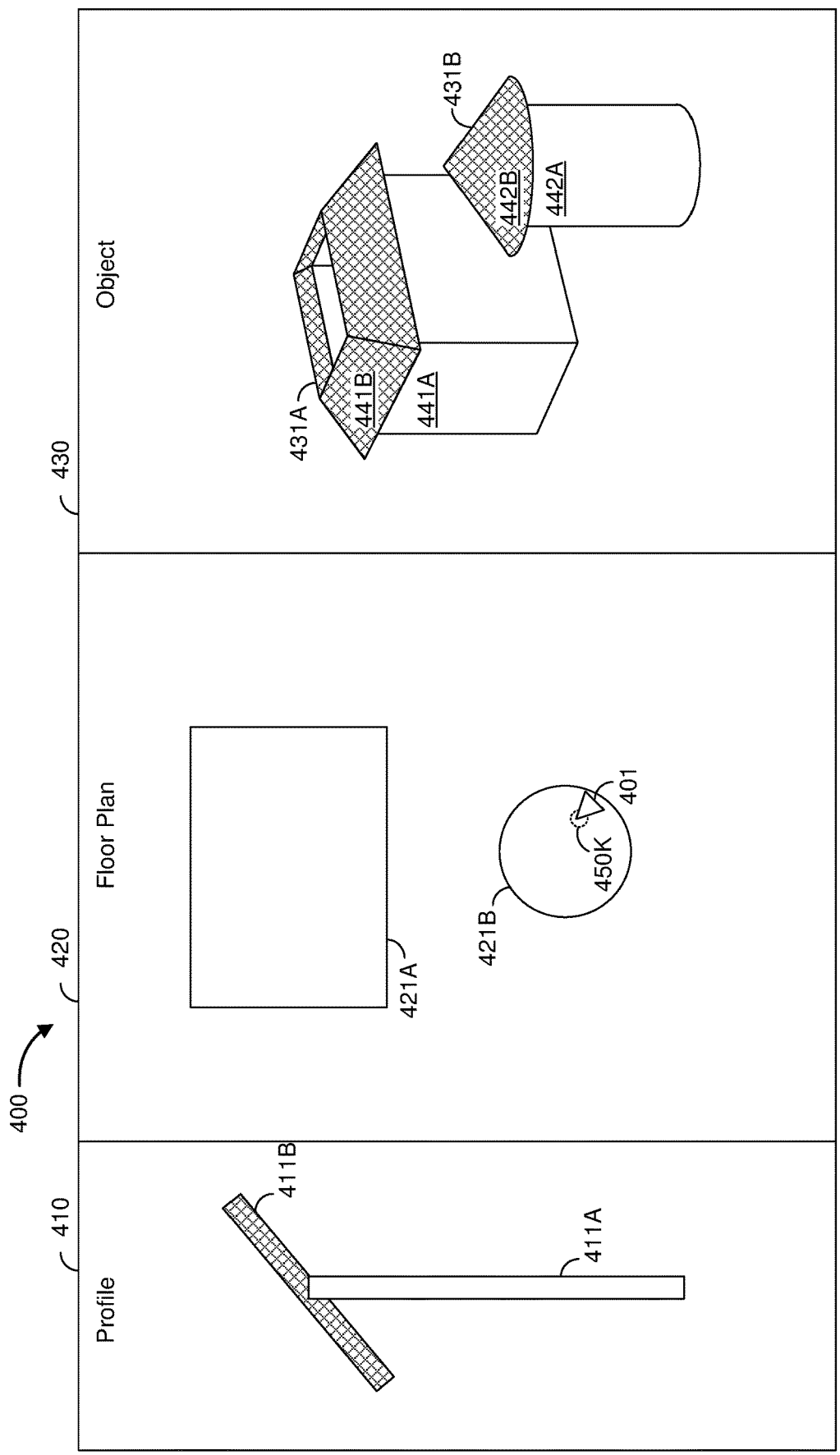

FIG. 4K illustrates the GUI 400 of FIG. 4J in response to detecting the tenth user input 450J. In FIG. 4K, the selected texture is assigned to the second segment 411B as indicated by the changed display of the second segment 411B to indicate the selected texture. Further, in the object portion 430, the second portion 441B of the first three-dimensional object 431A and the second portion 442B of the second three-dimensional object 431B are displayed with the selected texture. In various implementations, the texture is a solid color, a heuristic pattern, or a repeating image.

In various implementations, once a texture is assigned to a particular segment, the texture can be modified by interacting the with particular segment in the profile portion 410 or the corresponding portion of the three-dimensional object 431A in the object portion 430. For example, in various implementations, a user performs a pinch gesture (e.g., at the location of the particular segment or the corresponding portion) to change a scale and/or resolution of the texture (providing coarser or finer details) on the three-dimensional object 431A. As another example, in various implementations, a user performs a dragging (or swiping) gesture (e.g., at the location of the particular segment or the corresponding portion) to offset the texture on the three-dimensional object 431A. As another example, in various implementations, a user performs a rotation gesture (e.g., at the location of the particular segment or the corresponding portion) to rotate the texture on the three-dimensional object 431A.

FIG. 4K illustrates the cursor 401 providing an eleventh user input 450K indicative of selection of the second shape 421B in the floor plan portion 420. In various implementations, the eleventh user input 450K is input by a user clicking a mouse button while the cursor 401 is located at the second shape 421B. In various implementations, the eleventh user input 450K is input by tapping a finger (or stylus) on a touch-sensitive surface where the second shape 421B is displayed. In various implementations, the eleventh user input 450K is input by gesturing at the second shape 421B in a CGR environment.

Figure 4L:
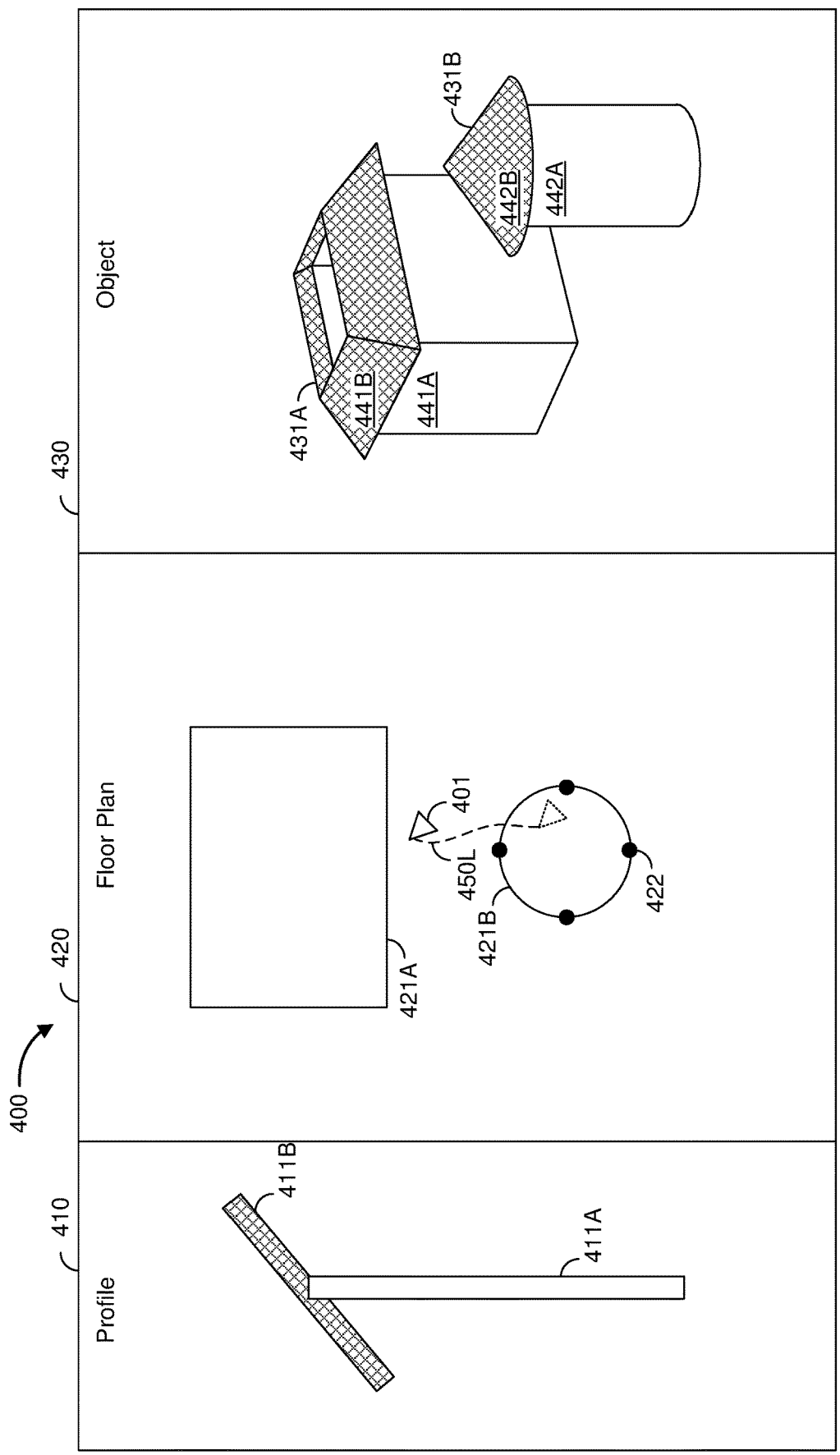

FIG. 4L illustrates the GUI 400 of FIG. 4K in response to detecting the eleventh user input 450K. In response to detecting the eleventh user input 450K, the second shape 421B is displayed with selection indicia 422 at points of the second shape 421B. The selection indicia 422 indicate that the second shape 421B is selected.

FIG. 4L illustrates the cursor 401 providing a twelfth user input 450L indicative of a motion in a generally upward direction from the location of the second shape 421B in the floor plan portion 420 to a second location closer to the first shape 421A in the floor plan portion 420. In various implementations, the twelfth user input 450L is input by a user depressing a mouse button, moving the mouse in a generally upward direction, and releasing the mouse button. In various implementations, the twelfth user input 450L is input by dragging a finger (or stylus) from the first location to the second location on a touch-sensitive surface displaying the GUI 400. In various implementations, the twelfth user input 450L is input by performing a gesture in a CGR environment grabbing the second shape 421B and moving it to a new location.

Figure 4M:
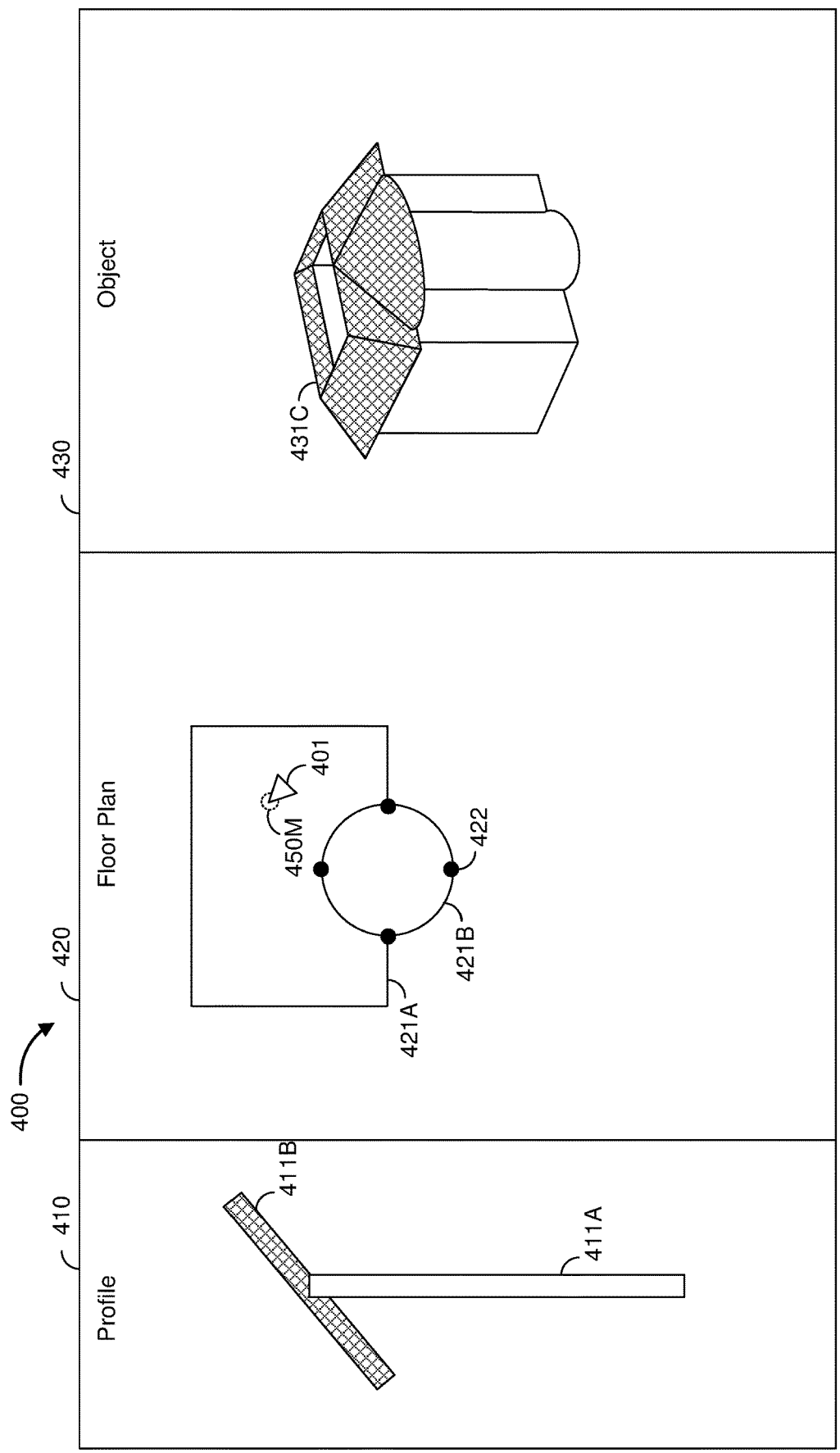

FIG. 4M illustrates the GUI 400 of FIG. 4L in response to detecting the twelfth user input 450L. In response to detecting the twelfth user input 450L, the floor plan portion 420 includes the second shape 421B overlapping the first shape 421A. In response to a change in the floor plan defined by the first shape 41A and the second shape 421B, the object portion 430 is corresponding changed to display a single three-dimensional object 431C corresponding to the two-dimensional profile (defined by the first segment 411A and the second segment 411B) and the two-dimensional floor plan (defined by the first shape 421A and the second shape 421B.

FIG. 4M illustrates the cursor 401 providing a thirteenth user input 450M indicative of selection of the first shape 421A in the floor plan portion 420. In various implementations, the thirteenth user input 450M is input by a user clicking a mouse button while the cursor 401 is located at the first shape 421A. In various implementations, the thirteenth user input 450M is input by tapping a finger (or stylus) on a touch-sensitive surface where the first shape 421A is displayed. In various implementations, the thirteenth user input 450M is input by gesturing at the first shape 421A in a CGR environment.

Figure 4N:
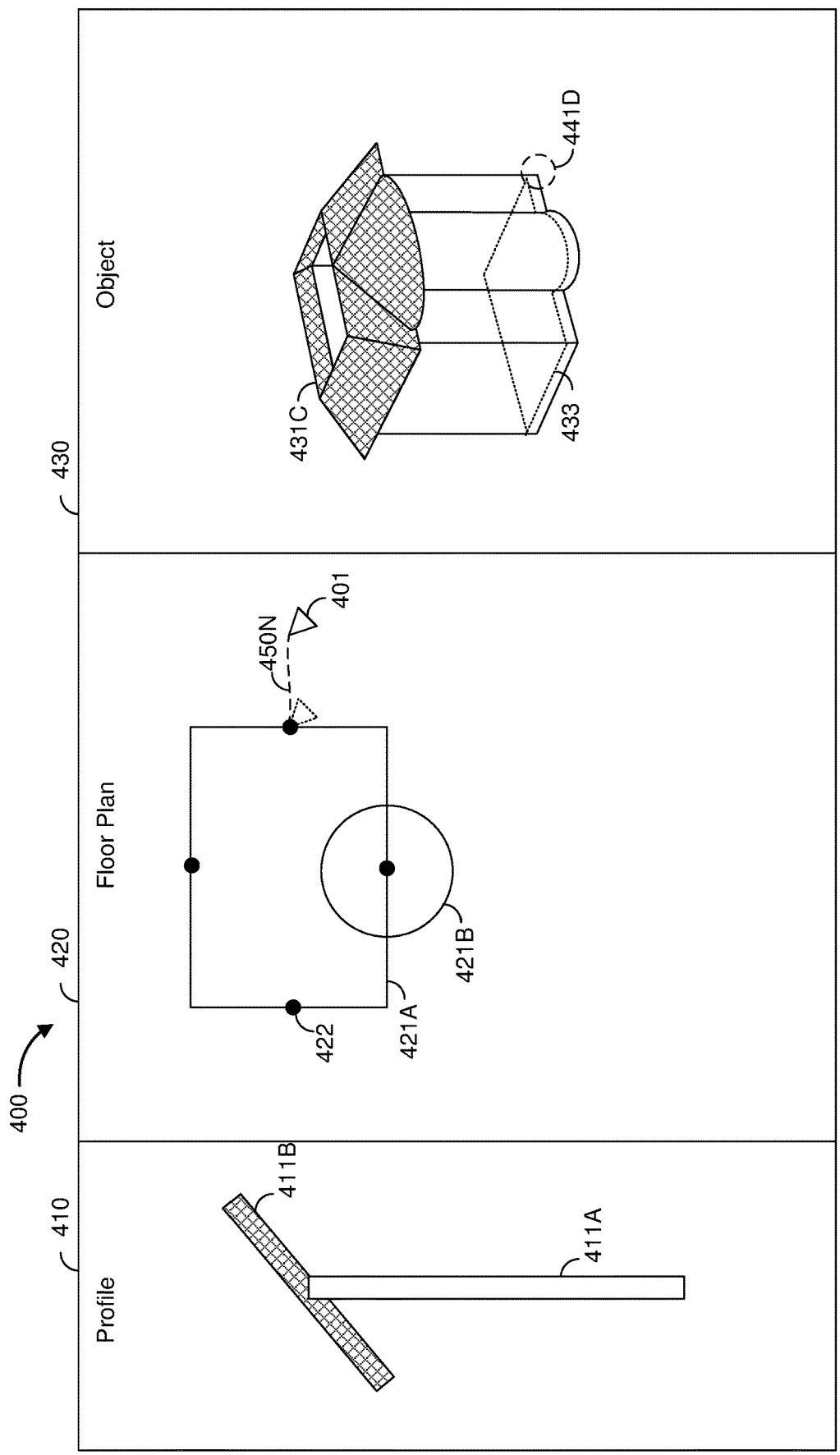

FIG. 4N illustrates the GUI 400 of FIG. 4M in response to detecting the thirteenth user input 450M. In response to detecting the thirteenth user input 450M, the first shape 421A is displayed with the selection indicia 422 at points of the first shape 421A. The selection indicia 422 indicate that the first shape 421A (and not the second shape 421B) is selected.

FIG. 4L illustrates the cursor 401 providing a fourteenth user input 450N indicative of a motion in a generally rightward direction from the location of the selection indicia 422 at points of the first shape 421A in the floor plan portion 420 to a second location in the floor plan portion 420. In various implementations, the fourteenth user input 450N is input by a user depressing a mouse button, moving the mouse in a generally rightward direction, and releasing the mouse button. In various implementations, the fourteenth user input 450N is input by dragging a finger (or stylus) from the first location to the second location on a touch-sensitive surface displaying the GUI 400. In various implementations, the fourteenth user input 450N is input by performing a gesture in a CGR environment grabbing the edge of the first shape 421A and moving it to a new location.

In various implementations, the floor plan is changed in a CGR environment setting by interaction with the object portion 430, e.g., with the three-dimensional object 431C. For example, in various implementations, to resize the first shape 421A, a user performs a gesture grabbing the corner (indicated by the circle 441D) of the three-dimensional object 431A and dragging the corner rightward. As another example, in various implementations, to resize the first shape 421A, a user performs a gesture pushing or pulling a wall of the three-dimensional object 431A (e.g., a vertical surface of the first portion 441A).

In various implementations, to facilitate manipulation of the floor plan via interaction with the three-dimensional object 431C, the floor plan is displayed as an overlay 433 over the base of the three-dimensional object 431C.

Figure 4O:
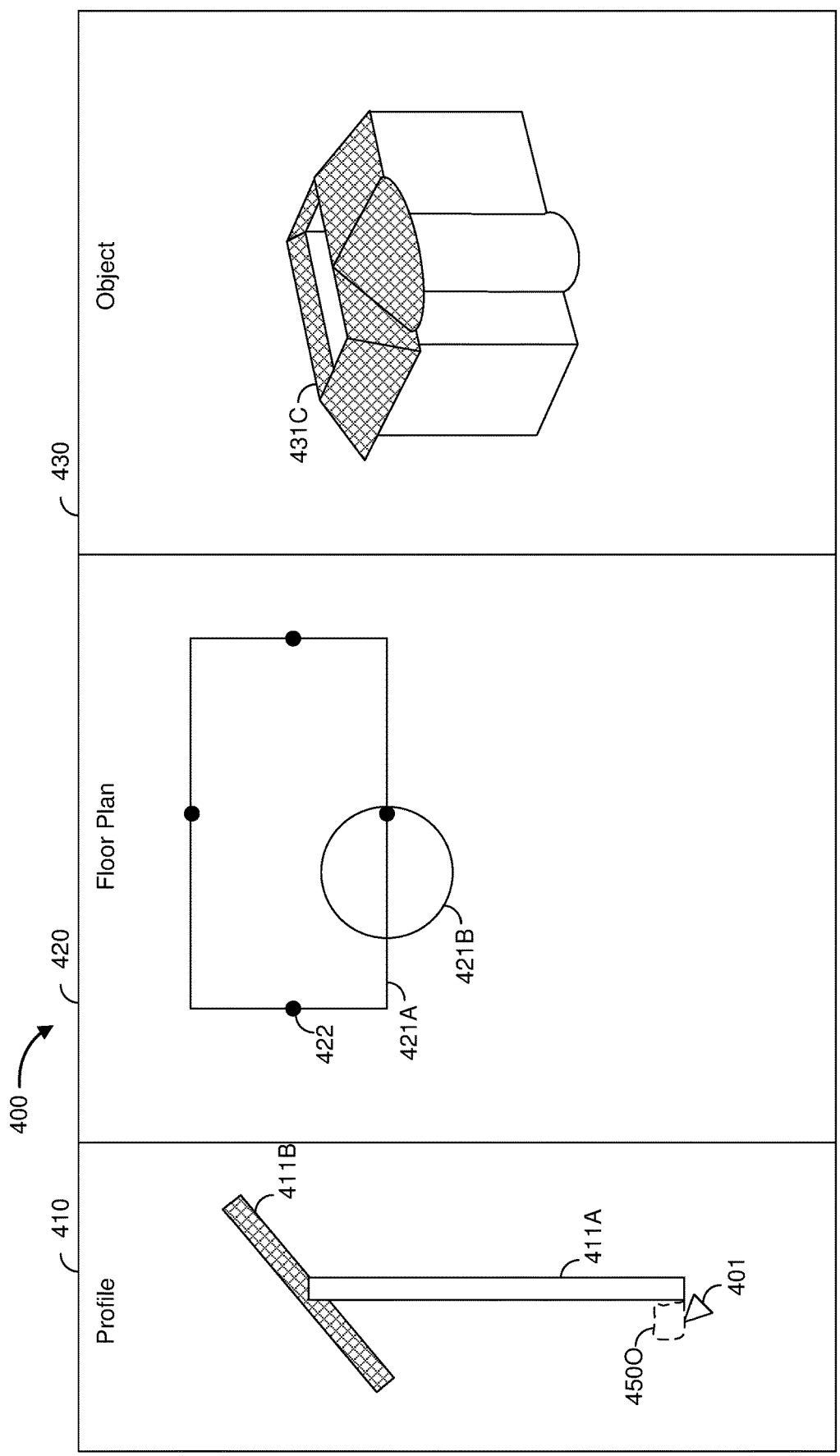

FIG. 4O illustrates the GUI 400 in response to detecting the fourteenth user input 450N resizing the first shape 421A. In response to the fourteenth user input 450N, the floor plan (defined by the first shape 421A and the second shape 421B) displayed in the floor plan portion 420 is changed by the resizing of the first shape 421A. Further, the three-dimensional object 431C is changed by the changed floor plan.

FIG. 4O illustrates the cursor 401 providing a fifteenth user input 450O indicative of a generally square shape in the profile portion 410. In various implementations, the fifteenth user input 450O is input by a user depressing a mouse button, moving the mouse to define a generally square shape, and releasing the mouse button. In various implementations, the fifteenth user input 450O is input by dragging a finger (or stylus) to define a generally square shape on a touch-sensitive surface displaying the GUI 400. In various implementations, the fifteenth user input 450O is input by moving a finger in a CGR environment to define a generally square shape.

In various implementations, the fifteenth user input 450O inserting a square segment into the profile portion 410 includes performing a drag-and-drop of a square shape from a shapes menu (not shown) to a location in the floor plan portion 420.

Figure 4P:
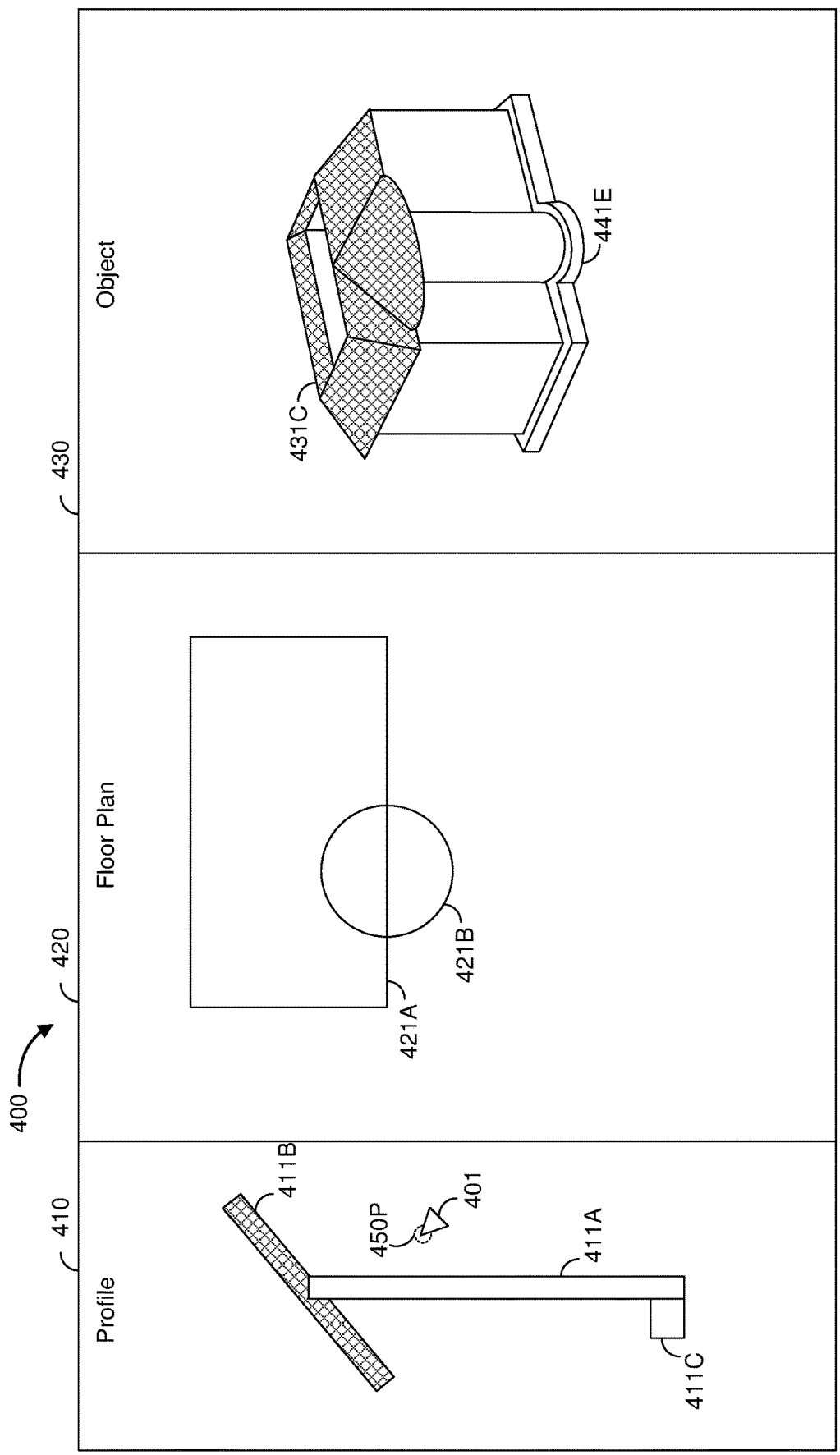

FIG. 4P illustrates the GUI 400 of FIG. 4O in response to detecting the fifteenth user input 450O. In response to detecting the fifteenth user input 450O, the profile portion includes a third segment 411C of a square shape. Also in response to detecting the fifteenth user input 450O, in response to the profile (defined by the first segment 411A, the second segment 411B, and the third segment 411C) changing, the three-dimensional object 431C is also changed by the addition of a portion 441E appearing as a step at the foot of the three-dimensional object 431C corresponding to the third segment 411C.

FIG. 4P illustrates the cursor 401 providing a sixteenth user input 450P indicative of a request to open a profile menu. In various implementations, the sixteenth user input 450P is input by a user clicking an alternative mouse button (e.g., a "right click") while the cursor 401 is located at an unoccupied space of the profile portion 410. In various implementations, the sixteenth user input 450P is input by a user clicking a mouse button for at least a threshold amount of time at an unoccupied location of the profile portion 410. In various implementations, the sixteenth user input 450P is input by touching a finger (or stylus) to a touch-sensitive surface at an unoccupied location of the profile portion 410 for at least a threshold amount of time (e.g., a "long press") or with at least a threshold amount of pressure (e.g., a "hard press"). In various implementations, the sixteenth user input 450P is input by a voice gesture requesting opening of the profile menu.

Figure 4Q:
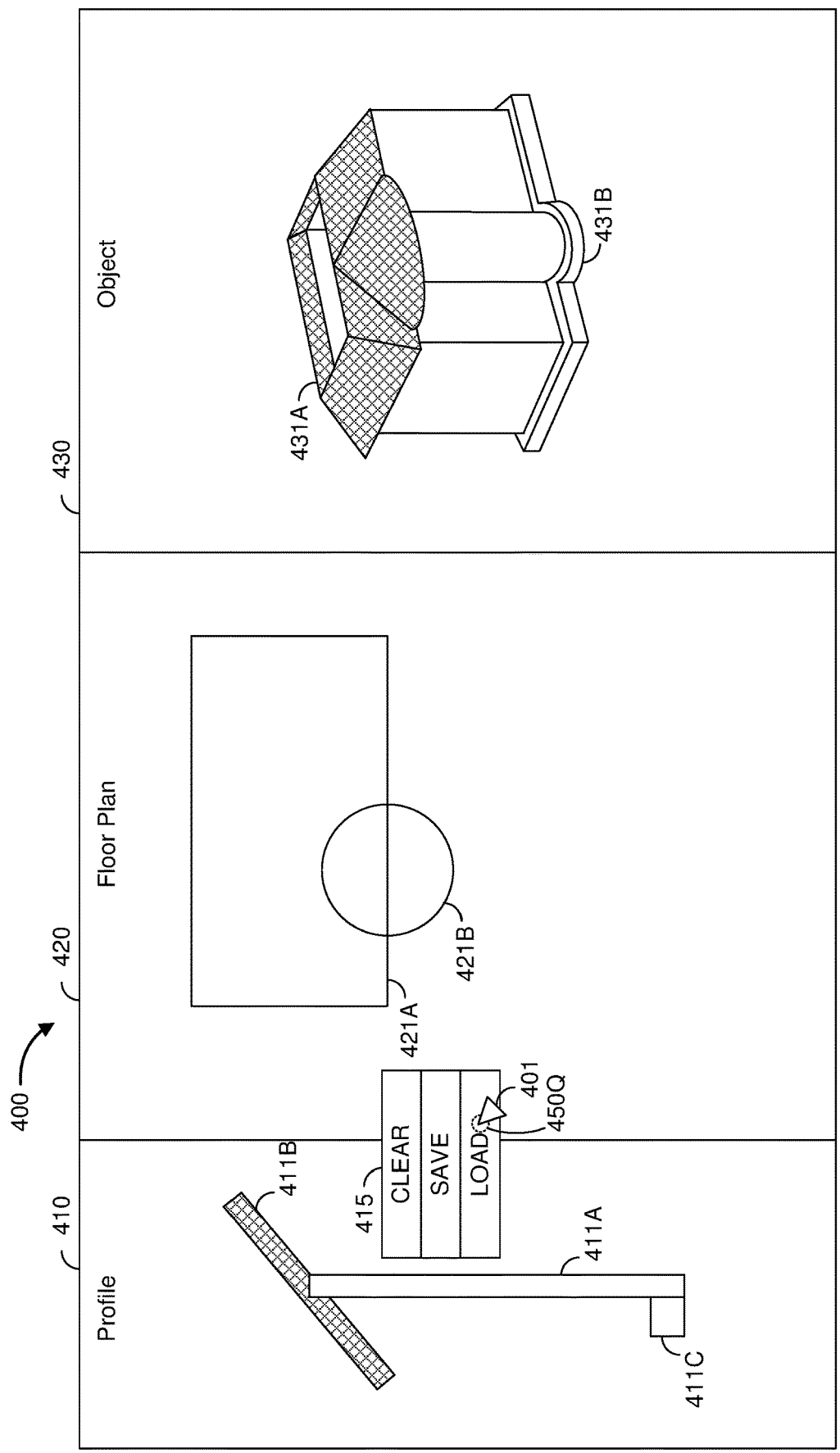

FIG. 4Q illustrates the GUI 400 of FIG. 4P in response to detecting the sixteenth user input 450P. In response to detecting the sixteenth user input 450P, the GUI 400 includes a profile menu 415 with a number of affordances for interacting with the profile portion 410. In various implementations (and as illustrated in FIG. 4Q), the profile menu 415 includes a clear-profile affordance for removing all segments from the profile portion 410, a save-profile affordance for saving the profile (defined by the first segment 411A, the second segment 411B, and the third segment 411C), and a load-profile affordance for replacing the current two-dimensional profile with another two-dimensional profile saved in a non-transitory memory.

FIG. 4Q illustrates the cursor 401 providing a seventeenth user input 450Q indicative selection of the load-profile affordance. In various implementations, the seventeenth user input 450Q is input by a user clicking a mouse button while the cursor 401 is located at the load-profile affordance. In various implementations, the seventeenth user input 450Q is input by tapping a finger (or stylus) on a touch-sensitive surface where the load-profile is displayed. In various implementations, the seventeenth user input 450Q is input by gesturing to indicate the load-profile affordance in a CGR environment. For example, in various implementations, the seventeenth user input 450Q includes performing a gesture while the load-profile affordance is selected and/or highlighted.

Figure 4R:
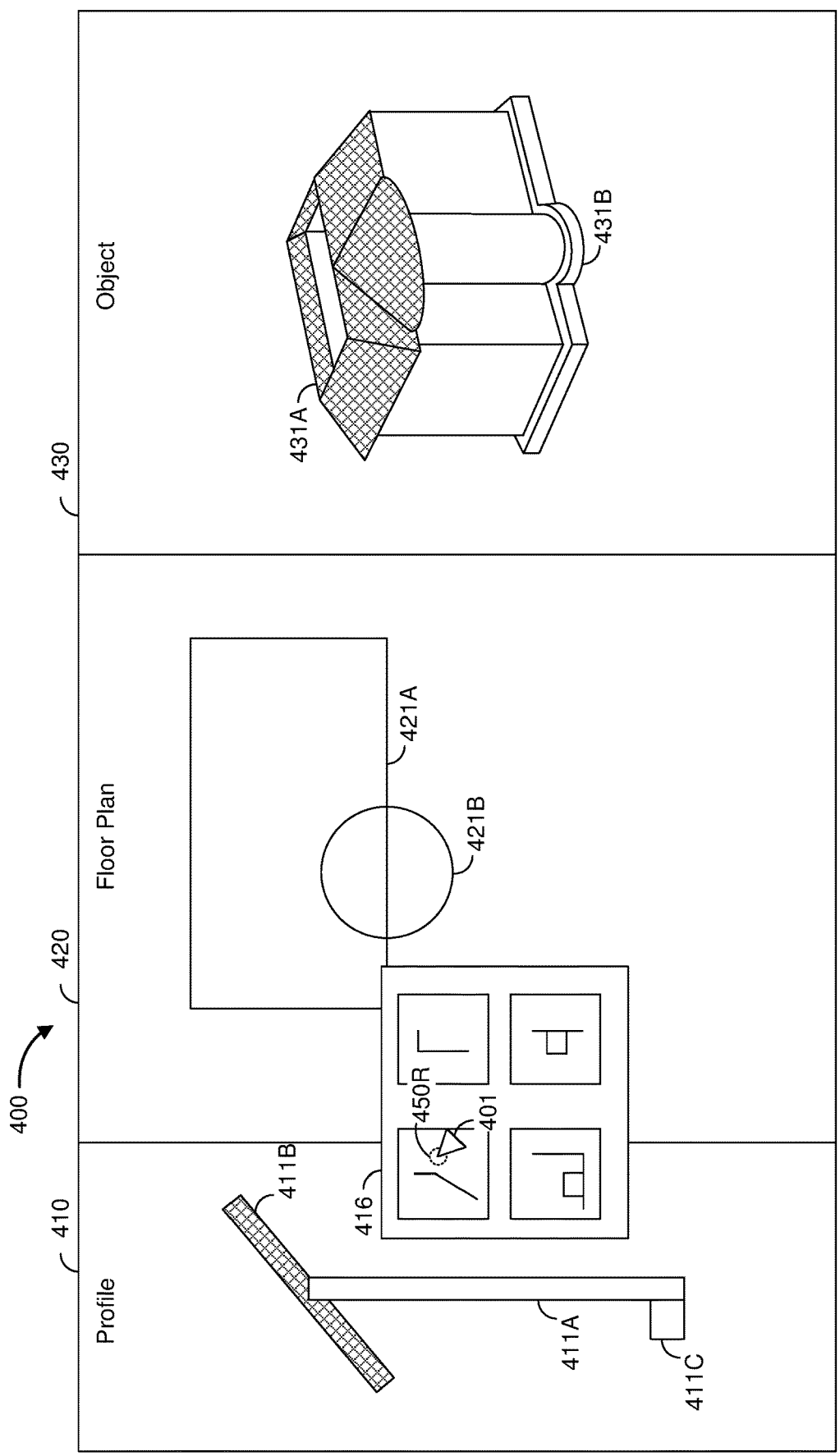

FIG. 4R illustrates the GUI 400 of FIG. 4Q in response to detecting the seventeenth user input 450Q selecting the load-profile affordance. In FIG. 4R, the profile menu 415 is replaced with load-profile menu 416 including a plurality of load-profile affordances associated with respective stored profiles.

FIG. 4R illustrates the cursor 401 providing an eighteenth user input 450R indicative of selection of a particular load-profile affordance of the load-profile menu 416. In various implementations, the eighteenth user input 450R is input by a user clicking a mouse button while the cursor 401 is located at the particular load-profile affordance. In various implementations, the eighteenth user input 450R is input by tapping a finger (or stylus) on a touch-sensitive surface where the particular load-profile affordance is displayed. In various implementations, the eighteenth user input 450R is input by gesturing to indicate the particular load-profile affordance in a CGR environment. For example, in various implementations, the eighteenth user input 450R includes performing a gesture while the particular load-profile affordance is selected and/or highlighted.

Whereas FIGS. 4P-4R illustrate user inputs in the profile portion 410 for loading a saved profile, in various implementations, similar user inputs in the floor plan portion 420 are provided to load a saved floor plan.

Figure 4S:
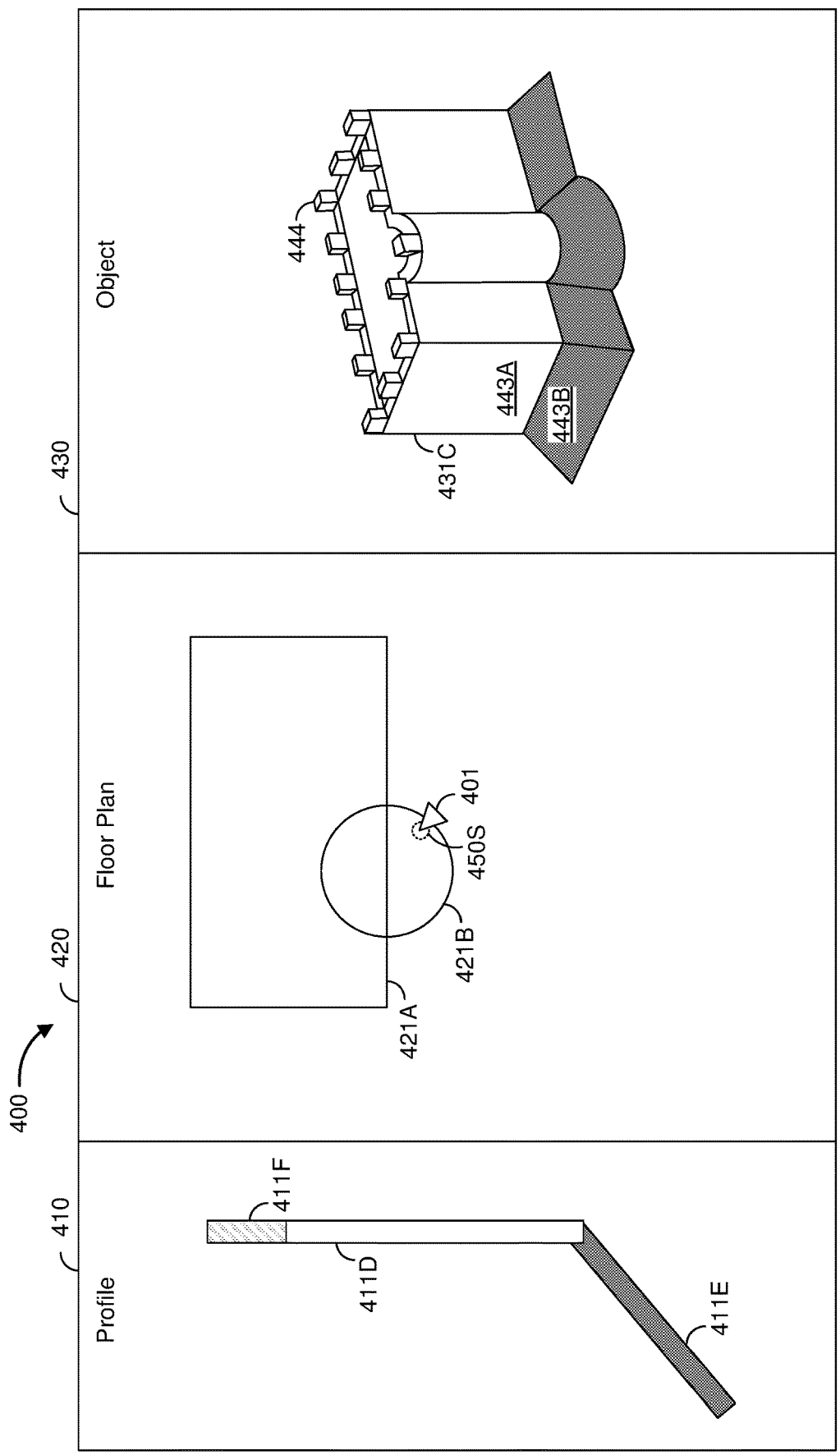

FIG. 4S illustrates the GUI 400 in response to detecting the eighteenth user input 450R indicating a particular stored two-dimensional profile. In response to detecting the eighteenth user input 450R, the two-dimensional profile of FIG. 4R including the first segment 411A, the second segment 411C, and the third segment 411C is replaced with a different two-dimensional profile including a fourth segment 411D, a fifth segment 411E, and a sixth segment 411F. The fifth segment 411E is associated with a texture (different than the texture of the second segment 411B). The sixth segment 411F is associated with a periodic repetition, in particular, crenellations 444. Other periodic repetitions include arches, windows (as may be added to the fourth segment 411C), columns, and street lights.

In response to detecting the eighteenth user input 450R, and in response to the two-dimensional profile changing from the two-dimensional profile of FIG. 4R to the two-dimensional profile of FIG. 4S (defined by the fourth segment 411D, the fifth segment 411E, and the sixth segment 411F), the three-dimensional object 431C is changed.

The three-dimensional object 431C is generated based on the new two-dimensional profile, but remains based on the unchanged two-dimensional floor plan (defined by the first shape 421A and the second shape 421B). Accordingly, the three-dimensional object 431C includes a first portion 443A corresponding to the fourth segment 411D and the two-dimensional floor plan, a second portion 443B corresponding to the fifth segment 411E and the two-dimensional floor plan, and crenellations 444 based on the sixth segment 411F and the two-dimensional floor plan.

FIG. 4S illustrates the cursor 401 providing a nineteenth user input 450S indicative of a request to interact with the second shape 421B. In various implementations, the nineteenth user input 450S is input by a user clicking an alternative mouse button (e.g., a "right click") while the cursor 401 is located at second shape 421B. In various implementations, the nineteenth user input 450S is input by a user clicking a mouse button for at least a threshold amount of time at the location of the second shape 421B. In various implementations, the nineteenth user input 450S is input by touching a finger (or stylus) to a touch-sensitive surface at the location of the second shape 421B for at least a threshold amount of time (e.g., a "long press") or with at least a threshold amount of pressure (e.g., a "hard press"). In various implementations, the nineteenth user input 450S is input by a gesture in which the user indicates the second shape 421B for at least a threshold amount of time.

Figure 4T:
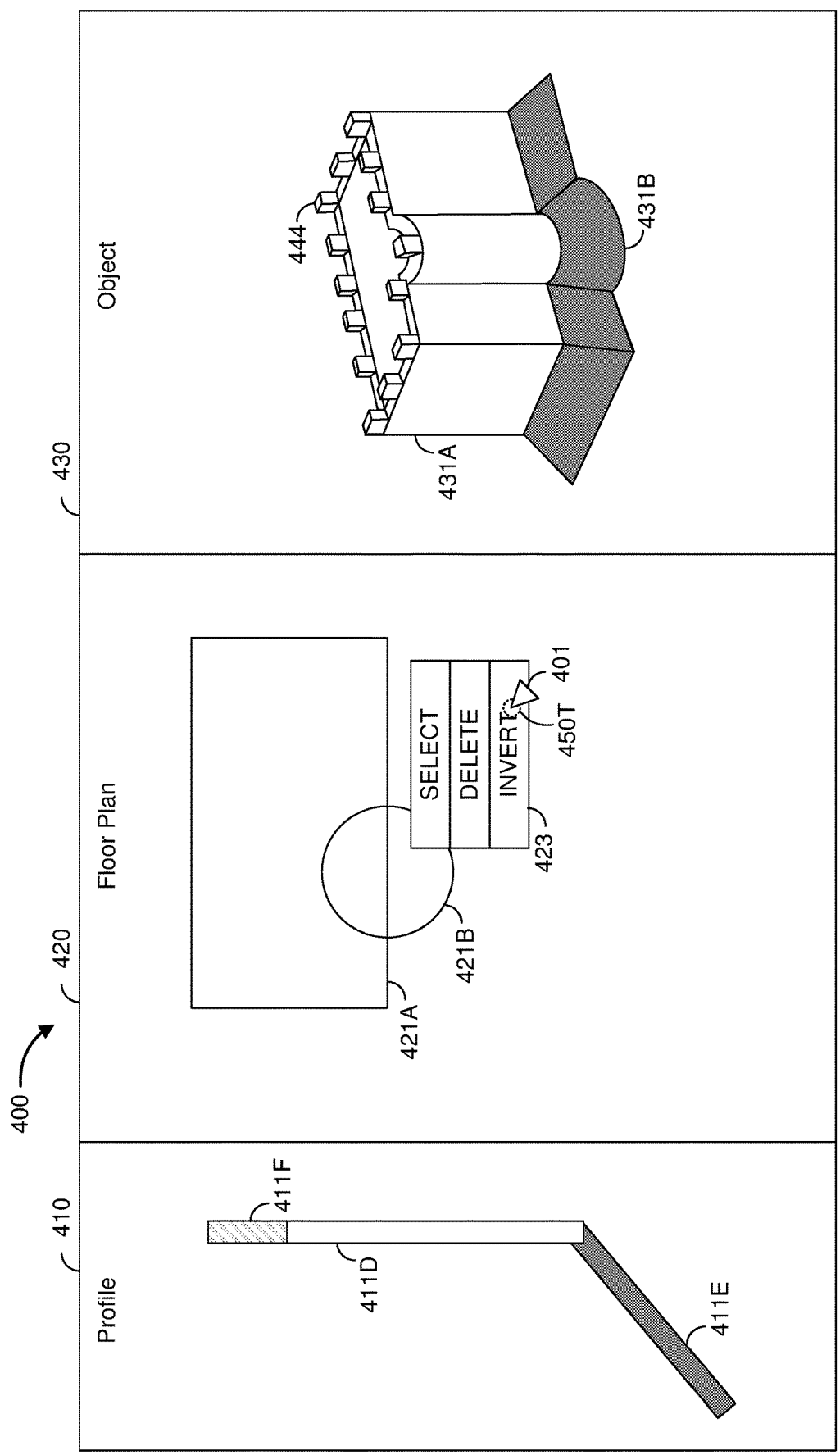

FIG. 4T illustrates the GUI 400 of FIG. 4S in response to detecting the nineteenth user input 450S. In response to detecting the nineteenth user input 450S, the GUI 400 includes a shape menu 422 with a number of affordances for interacting with the second shape 421B. In various implementations (and as illustrated in FIG. 4I), the shape menu 423 includes a select affordance for selecting the second shape (and, thereby displaying selection indicia with respect to the second shape 421B), a delete affordance for deleting the second shape 421B, and an invert affordance for inverting the second shape 421B as described below.

FIG. 4T illustrates the cursor 401 providing a twentieth user input 450T indicative selection of the invert affordance. In various implementations, the twentieth user input 450T is input by a user clicking a mouse button while the cursor 401 is located at the invert affordance. In various implementations, the twentieth user input 450T is input by tapping a finger (or stylus) on a touch-sensitive surface where the invert affordance is displayed. In various implementations, the twentieth user input 450T is input by gesturing to indicate the invert affordance in a CGR environment. For example, in various implementations, the twentieth user input 450T includes performing a gesture while the invert affordance is selected and/or highlighted.

Figure 4U:
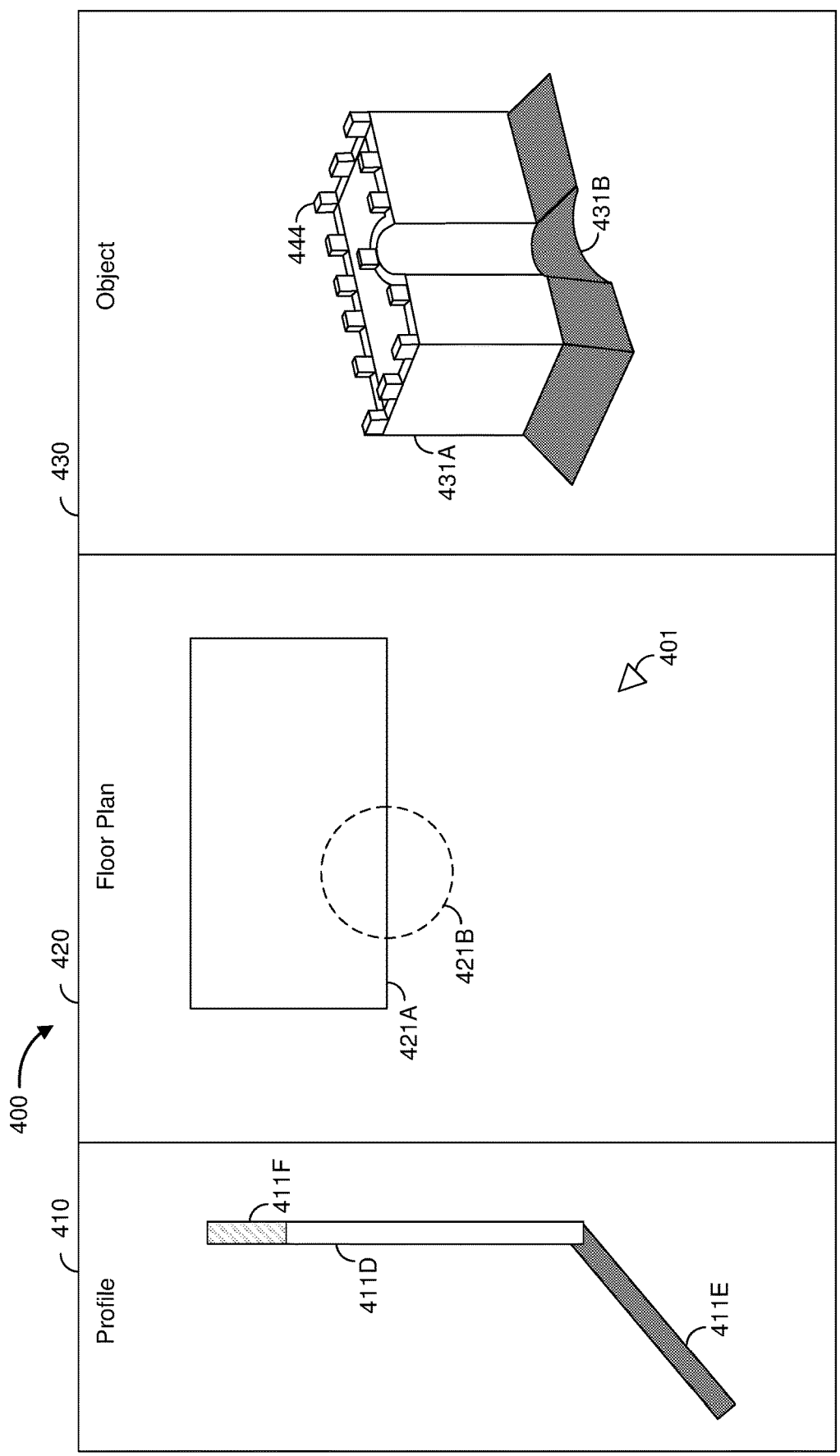

FIG. 4U illustrates the GUI 400 of FIG. 4T in response to detecting the twentieth user input 450T. In response to detecting the twentieth user input 450T the second shape 421B is inverted such that, rather than adding to the floor plan defined by the first shape 421A, it subtracts from first shape 421A. Accordingly, the floor plan portion 420 displays the second shape 421B differently than in FIG. 4T. Further, in response to the change in floor plan as now defined by the first shape 421A and the inverted second shape 421B, the three-dimensional object 431A displayed in the object portion 430 is also changed.

Figure 5B:
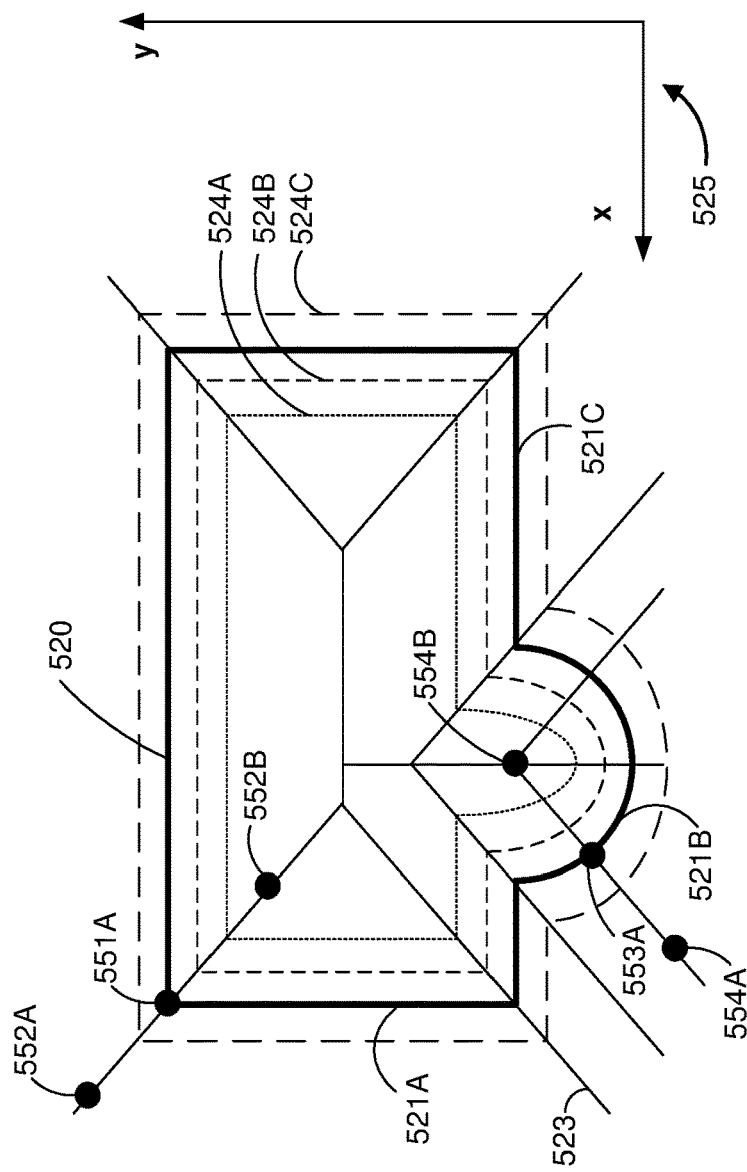
FIGS. 5A-5C illustrate a two-dimensional profile, two-dimensional floor plan, and three-dimensional object based on the two-dimensional profile and two-dimensional floor plan in accordance with some implementations.
Figure 5A:
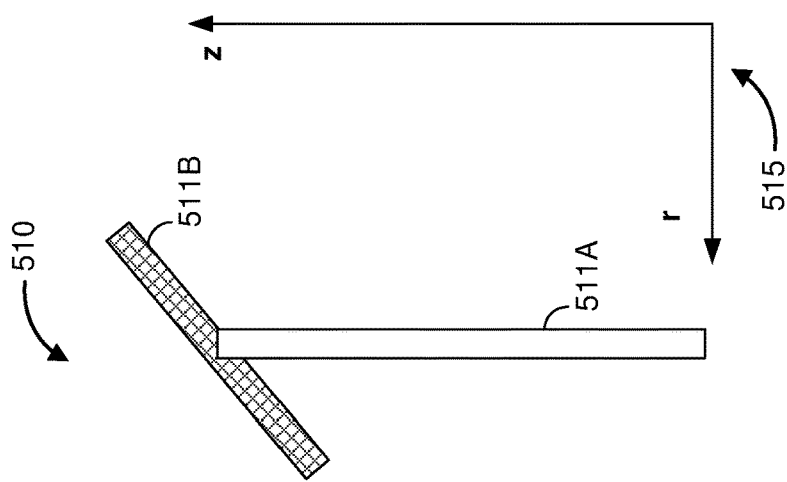

FIG. 5A illustrates an example profile 510 in accordance with some implementations. The profile 510 includes a plurality of segments defined in an r-z coordinate space (illustrated by the r-z axis 515). Thus, the profile 510 includes a first segment 511A having ends at $(r_{11}, z_{11})$ and $(r_{12}, z_{12})$. Because the first segment 511A is vertical, $r_{11}=r_{12}$. For simplicity of explanation, $(r_{11}, z_{11})$ is taken as the origin of the r-z coordinate space. Thus, the first segment 511A includes ends at (0,0) and (0, $z_{12}$). The profile 510 includes a second segment 511B having ends at ($r_{21}$, $z_{21}$) and ($r_{22}$, $z_{22}$) and associated with a texture.

FIG. 5B illustrates an example floor plan 520 in accordance with some implementations. The floor plan 520 includes a plurality of segments defined in an x-y coordinate space (illustrated by the x-y axis 525). The floor plan includes (among others), a first segment 521A having ends at ($x_{11}$, $y_{11}$) and ($x_{12}$, $y_{12}$), a second segment 521B having ends at ($x_{21}$, $y_{21}$) and ($x_{22}$, $y_{22}$), and a third segment 521C having ends at ($x_{31}$, $y_{31}$) and ($x_{32}$, $y_{32}$).

FIG. 5B further illustrates a straight skeleton 523 based on the floor plan 520 and a number of mitered offset curves 524A-524C. Each offset curve 524A-524C is associated with an r-coordinate value. Similarly, each r-coordinate value defines an offset curve of the floor plan 520. Each end of each segment 521A-521C of the floor plan 520 is associated with a branch of the straight skeleton 523.

Figure 5C:
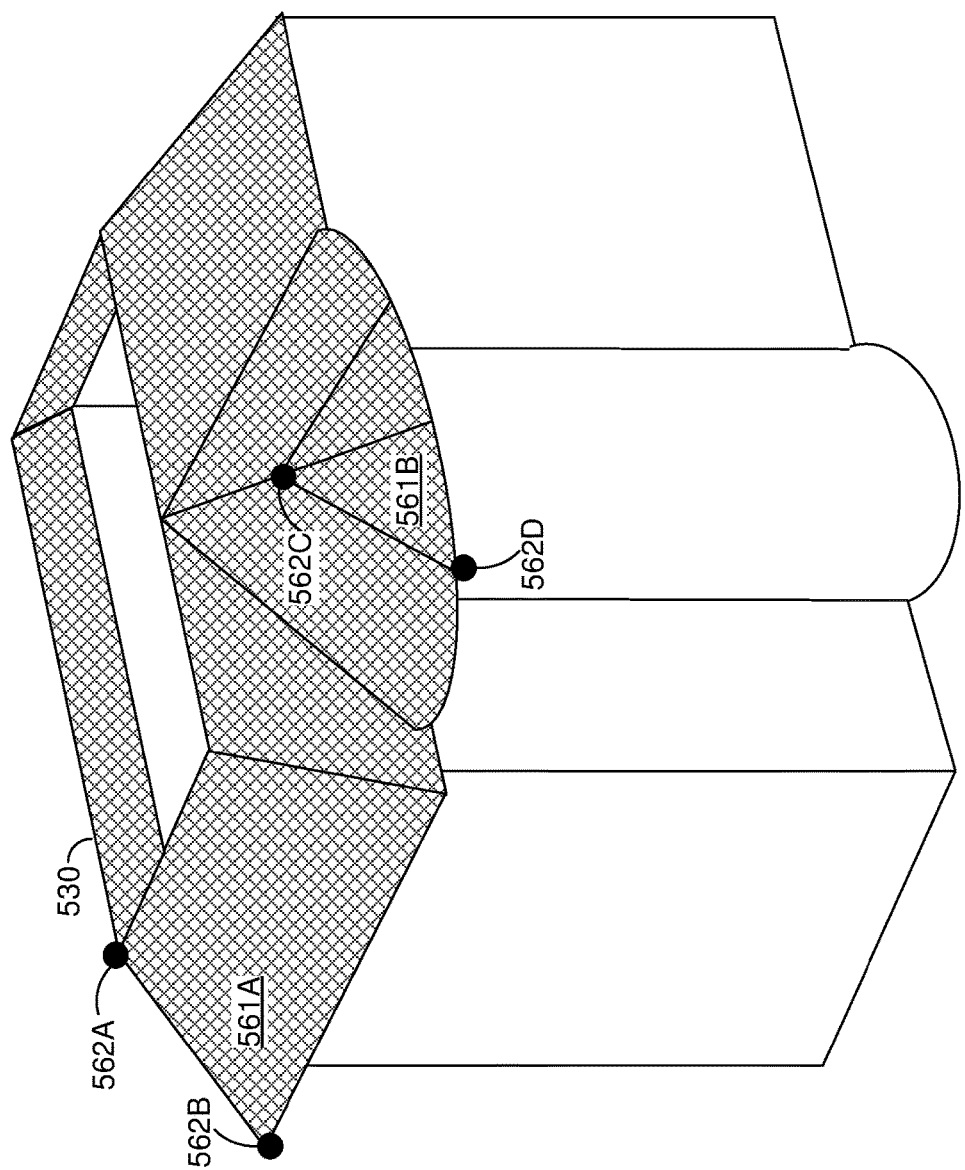

FIG. 5C illustrates a three-dimensional object 530 based on the profile 510 of FIG. 4A and the floor plan 520 of FIG. 5B in accordance with some implementations.

To generate a three-dimensional object based on the profile 510 and the floor plan 520, each pairing of a segment 511A-511B of the profile 510 and a segment 521A-521C of the floor plan 520 is used to generate a polygon in a three-dimensional coordinate system. In various implementations, the polygon includes four vertices. In various implementations, two of the four vertices of the polygon are the same, and the polygon includes three unique vertices.

For a particular pairing of a particular segment of the floor plan 520 and a particular segment of the profile 510, two points on the branch of the straight skeleton 523 corresponding to the first end of the particular segment of the floor plan 520 are determined based on the r-coordinate values of the first end and second end of the particular segment of the profile 510. If the r-coordinate value is zero or greater, the point on the branch of the straight skeleton 523 is an outward distance away from the first end of the particular segment of the floor plan 520 equal to the r-coordinate value. If the r-coordinate value is negative and its absolute value is less than the distance from the first end of the particular segment of the floor plan 520 to the connected node of the arm of the straight skeleton 523, the point on the branch of the straight skeleton 523 is an inward distance away from the first end of the particular segment of the floor plan 520 equal to the r-coordinate value. If the r-coordinate value is negative and its absolute value is greater than or equal to the distance from the first end of the particular segment of the floor plan 520 to the connected node of the arm of the straight skeleton 523, an adjusted r-coordinate value is determined equal to the distance from the first end of the particular segment of the floor plan 520 and the point on the branch of the straight skeleton 523 is the connected node of the arm of the straight skeleton 523. Two points on the branch of the straight skeleton 523 corresponding to the second end of the particular segment of the floor plan 520 are similarly determined based on the r-coordinate values of the first end and second end of the particular segment of the profile 510.

For example, for the particular pairing of the first segment 521A of the floor plan 520 and the second segment 511B of the profile 510, two points 552A-552B on the branch of the straight skeleton 523 corresponding to the first end 551A of the first segment 521A of the floor plan 520 are determined based on the r-coordinate values of the first end and second end of the second segment 511B of the profile. The distance between the first end 551A of the first segment 521A of the floor plan 520 and the first point 552A is equal to the r-coordinate value of the first end of the second segment 511B of the profile 510, e.g., $r_{21}$, and the distance between the first end 551A of the first segment 521A of the floor plan 520 and the second point 552B is equal to the r-coordinate value of the second end of the second segment 511B of the profile 510, e.g., $r_{22}$.

As another example, for the particular pairing of the second segment 521B of the floor plan 520 and the second segment 511B of the profile 510, two points 554A-554B on the branch of the straight skeleton 523 corresponding to the first end 553A of the second segment 521B of the floor plan 520 are determined based on the r-coordinate values of the first end and second end of the second segment 511B of the profile. The distance between the first end 553A of the second segment 521B of the floor plan 520 and the first point 554A is equal to the r-coordinate value of the first end of the second segment 511B of the profile 510, e.g., $r_{21}$. However, the distance between the first end 553A of the second segment 521B of the floor plan 520 and the second point 554B is less than to the r-coordinate value of the second end of the second segment 511B of the profile 510, as the second point 554B is the connected node of the branch of the straight skeleton 523 corresponding to the first end 553A of the second segment 521B of the floor plan.

Thus, for a particular pairing of a particular segment of the floor plan 520 and a particular segment of the profile 510, four points on the branch of the straight skeleton 523 corresponding to the two ends of the particular segment of the floor plan 520 are determined based on the r-coordinate values of the first end and second end of the particular segment of the profile 510. These four points provide the x-coordinates and y-coordinates of the polygon corresponding to the particular pairing. The z-coordinates for the four points are determined based on the z-coordinates of the particular segment of the profile 510.

If the r-coordinate value is zero or greater, and the point on the branch of the straight skeleton 523 is an outward distance away from the first end of the particular segment of the floor plan 520 equal to the r-coordinate value of the end of the particular segment of the profile 510, the z-coordinate value of the vertex is the z-coordinate value of the end of the particular segment of the profile 510. If the r-coordinate value is negative and its absolute value is less than the distance from the first end of the particular segment of the floor plan 520 to the connected node of the arm of the straight skeleton 523 and the point on the branch of the straight skeleton 523 is an inward distance away from the first end of the particular segment of the floor plan 520 equal to the r-coordinate value, the z-coordinate value of the vertex is the z-coordinate value of the end of the particular segment of the profile 510. If the r-coordinate value is negative and its absolute value is greater than or equal to the distance from the first end of the particular segment of the floor plan 520 to the connected node of the arm of the straight skeleton 523, an adjusted r-coordinate value is determined equal to the additive inverse of the distance from the first end of the particular segment of the floor plan 520, and the point on the branch of the straight skeleton 523 is the connected node of the arm of the straight skeleton 523, the z-coordinate value of the vertex of the corresponding z-coordinate value of a point on the particular segment of the profile 510 having the adjusted r-coordinate value. Two points on the branch of the straight skeleton 523 corresponding to the second end of the particular segment of the floor plan 520 are similarly determined based on the r-coordinate values of the first end and second end of the particular segment of the profile 510.

For example, for the particular pairing of the first segment 521A of the floor plan 520 and the second segment 511B of the profile 510, two vertices 562A-562B of a polygon 561A are determined having x-coordinates and y-coordinates of the two points 552A-552B on the straight skeleton 523 and having z-coordinates equal to the z-coordinates of the second segment 511B of the profile 510, e.g., $z_{21}$ and $z_{22}$.

As another example, for the particular pairing of the second segment 521A of the floor plan 520 and the second segment 511B of the profile 510, two vertices 562C-562D of a polygon 561B are determined having x-coordinates and y-coordinates of the two points 554A-554B on the straight skeleton 523 and having z-coordinates of $z_{21}$ and $z_{23}$, the z-coordinate corresponding to the adjusted r-coordinate.

Figure 6:
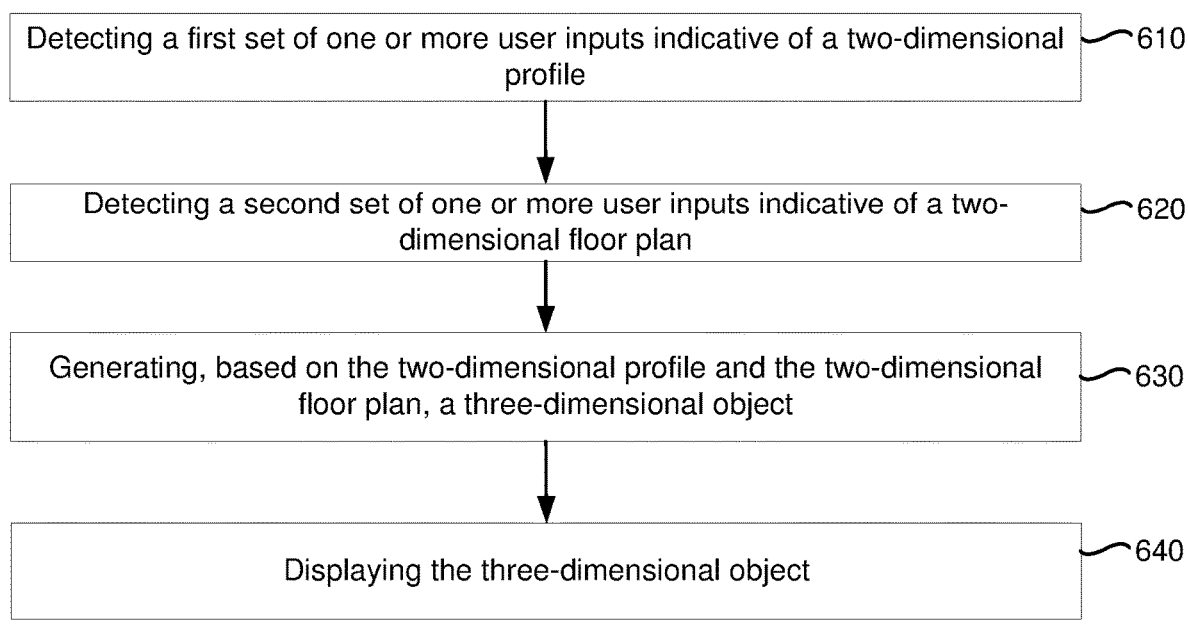
FIG. 6 is a flowchart representation of a method of generating a three-dimensional object in accordance with some implementations.

FIG. 6 is a flowchart representation of a method 600 of generating a three-dimensional object in accordance with some implementations. In various implementations, the method 600 is performed by a device with one or more processors, non-transitory memory, one or more input devices, and a display. In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device detecting a first set of one or more user inputs indicative of a two-dimensional profile. The two-dimensional profile extends in two dimensions, e.g., the z-dimension and r-dimension of FIG. 5A.

In various implementations, detecting the first set of one or more user inputs includes detecting, via one or more input devices (such as a mouse, touch-sensitive surface, or gesture detector), one or more user inputs such as a click, a drag, a touch, a swipe, or a hand gesture.

In various implementations, the first set of one or more user inputs includes a user input defining a segment of the profile. For example, in FIG. 4A, the first user input 450A defines the first segment 411A displayed in FIG. 4B. As another example, in FIG. 4B, the second user input 450B defines the second segment 411B displayed in FIG. 4C.

In various implementations, the first set of one or more user inputs includes a user input modifying a segment of the profile. For example, in FIG. 4G, the seventh user input 450G changes the length of the first segment 411A.

In various implementations, the first set of one or more user inputs includes a user input assigning a texture to a segment of the profile. For example, in FIG. 4J, the tenth user input 450J assigns a texture to the second segment 411B.

In various implementations, the first set of one or more user inputs includes a user input modifying the texture assigned to a segment of the profile (e.g., at a location of the segment of the profile or the corresponding portion of the three-dimensional object). Thus, in various implementations, a method is performed in which a texture is assigned to at least a portion of a three-dimensional object (e.g., a surface or multiple surfaces associated with a floor plan and a particular segment of a profile). For example, in various implementations, the texture is assigned by selecting a representation of the texture from a menu or performing a drag-and-drop operation dragging a representation of the texture from a menu and dropping the texture at a location corresponding to the portion of the three-dimensional object (e.g., a location of the portion of the three-dimensional object or a location of a segment corresponding to the portion of the three-dimensional object). The method includes modifying the assigned texture by performing a gesture at a location corresponding to the portion of the three-dimensional object (e.g., a location of the portion of the three-dimensional object or a location of a segment corresponding to the portion of the three-dimensional object).

In various implementations, the gesture modifying the assigned texture includes a gesture scaling the texture on the portion of the three-dimensional object (e.g., a pinch or reverse-pinch gesture). In various implementations, the gesture modifying the assigned texture includes a gesture offsetting the texture on the portion of the three-dimensional object (e.g., a drag or swipe gesture). In various implementations, the gesture modifying the assigned texture includes a gesture rotating the texture on the portion of the three-dimensional object (e.g., a rotation gesture in which two contacts rotate about each other).

In various implementations, the texture includes an image, a procedural generated texture, or relatively uniform scattered elements (e.g., grass on a floor surface).

In various implementations, the first set of one or more user inputs includes a user input loading a stored profile. For example, in FIG. 4R, the eighteenth user input 450R loads the profile (displayed in FIG. 4T) from a non-transitory memory.

The method 600 continues, in block 620, with the device detecting a second set of one or more user inputs indicative of a two-dimensional floor plan. The two-dimensional floor plan extends in two dimensions, e.g., the x-dimension and y-dimension of FIG. 5B.

In various implementations, the detecting the second set of one or more user inputs includes detecting, via one or more input devices (such as a mouse, touch-sensitive surface, or gesture detector), one or more user inputs such as a click, a drag, a touch, a swipe, or a hand gesture.

In various implementations, the second set of one or more user inputs includes a user input defining a shape of the floor plan. For example, in FIG. 4C, the third user input 450C defines the first shape 421A displayed in FIG. 4D. As another example, in FIG. 4E, the fifth user input 450E defines the second shape 421B displayed in FIG. 4F. In various implementations, the user input generally defines a shape and the device selects a shape from a set of predefined shapes based on the user input. For example, in FIG. 4C, the third user input 450C generally, but not exactly, defines a rectangular path. In response, the floor plan includes the first shape 421A that is exactly a rectangle. As another example, in FIG. 4E, the fifth user input 450E generally, but not exactly, defines a circular path. In response, the floor plan includes the second shape 421B that is exactly a circle. Other shapes that the device may select include a square, an ellipse, a triangle, an octagon, etc.

In various implementations, the second set of one or more user inputs includes a user input moving a shape of the floor plan. For example, in FIG. 4L, the twelfth user input 450L moves the second shape 421B from a first location in the floor plan portion 420 to a second location in the floor plan portion 420.

In various implementations, the second set of one or more user inputs includes a user input modifying a shape of the floor plan. For example, in FIG. 4N, fourteenth user input 450N modifies the first shape 421A by increasing a width of the first shape 421A.

In various implementations, the second set of one or more user inputs includes a user input inverting a shape of the floor plan. For example, in FIG. 4T, twentieth user input 450T inverts the second shape 421B.

In various implementations, the second set of one or more user inputs includes a user input defining a line of the floor plan (e.g., not a closed shape). In various implementations, the second set of one or more user inputs includes a user input deleting a shape or line of the floor plan.

The method 600 continues, in block 630, with the device generating, based on the two-dimensional profile and the two-dimensional floor plan, a three-dimensional object. The three-dimensional object extends in three dimensions, e.g., the x-dimension, y-dimension, and z-direction of FIG. 5C.

In various implementations, generating the three-dimensional object includes generating a polygon for a particular segment of the two-dimensional profile and a particular segment of the two-dimensional floor plan. For example, in FIG. 5C, the three-dimensional object 530 includes a polygon 561A based on the second segment 511B of the profile 510 and the first segment 521A of the floor plan 520.

In various implementations, generating the three-dimensional object includes generating a polygon for each pairing of a segment of the two-dimensional profile and a segment of the two-dimensional floor plan.

In various implementations, generating the polygon includes determining four vertices of the polygon respectively based on a first end of the particular segment of the two-dimensional profile and a first end of the particular segment of the two-dimensional floor plan, a second end of the particular segment of the two-dimensional profile and the first end of the particular segment of the two-dimensional floor plan, the first end of the particular segment of the two-dimensional profile and a second end of the particular segment of the two-dimensional floor plan, and the second end of the particular segment of the two-dimensional profile and the second end of the particular segment of the two-dimensional floor plan.

In various implementations, determining the four vertices is based on a straight skeleton of the floor plan. For example, in FIG. 5C, the two vertices 562A-562B of the polygon 561A are determined having x-coordinates and y-coordinates of the two points 552A-552B on the straight skeleton 523 and having z-coordinates equal to the z-coordinates of the second segment 511B of the profile 510, e.g., $z_{21}$ and $z_{22}$.

In various implementations, generating the three-dimensional object includes generating three-dimensional sub-objects arranged at spaced locations of the floor plan. For example, in FIG. 4S, the three-dimensional object 431C includes crenellations 444 arranged at spaced locations of the floor plan.

The method 600 continues, in block 640, with the device displaying the three-dimensional object. For example, in FIG. 4M, the three-dimensional object 431C is displayed in the object portion 430. In various implementations, the device displays the three-dimensional object on a display device. In various implementations, displaying the three-dimensional object includes displaying a computer-generated reality (CGR) environment and displaying the three-dimensional object in the CGR environment. In various implementations, the device saves the three-dimensional object in a non-transitory memory.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   detecting a first set of one or more user inputs that specify a first segment of a two-dimensional profile and a second segment of the two-dimensional profile;
   detecting a second set of one or more user inputs indicative of a shape of a two-dimensional floor plan;
   generating, based on the two-dimensional profile and the two-dimensional floor plan, a three-dimensional object, wherein the three-dimensional object includes:
     a first portion corresponding to the first segment of the two-dimensional profile, and
     a second portion corresponding to the second segment of the two-dimensional profile and the shape of the two-dimensional floor plan; and
   displaying the three-dimensional object.

2. The method of claim 1, wherein the first set of one or more user inputs includes a user input modifying at least one of the first segment or the second segment of the two-dimensional profile.

3. The method of claim 1, wherein the first set of one or more user inputs includes a user input loading a stored two-dimensional profile.

4. The method of claim 1, wherein the first set of one or more user inputs includes a user input assigning a texture to at least one of the first segment or the second segment of the two-dimensional profile.

5. The method of claim 4, wherein the first set of one or more inputs includes a user input modifying the texture assigned to the at least one of the first segment or the second segment of the two-dimensional profile.

6. The method of claim 5, wherein user input modifying the texture assigned to the at least one of the first segment or the second segment of the two-dimensional profile includes at least one of a user input scaling the texture, a user input offsetting the texture, or a user input rotating the texture.

7. The method of claim 1, wherein the second set of one or more user inputs includes a user input defining the shape of the two-dimensional floor plan.

8. The method of claim 7, wherein the user input defining the shape of the two-dimensional floor plan includes a user input generally defining a path and the shape of the two-dimensional floor plan that is selected from a set of pre-defined shapes based on the path.

9. The method of claim 1, wherein the second set of one or more user inputs includes a user input moving the shape of the two-dimensional floor plan.

10. The method of claim 1, wherein the second set of one or more user inputs includes a user input modifying the shape of the two-dimensional floor plan.

11. The method of claim 1, wherein the second set of one or more user inputs includes a user input inverting the shape of the two-dimensional floor plan.

12. The method of claim 1, wherein detecting the first set of one or more user inputs and/or detecting the second set of one or more user inputs includes detecting, via one or more input devices, one or more of a mouse click, a mouse motion, a contact on a touch-sensitive surface, or a hand gesture.

13. The method of claim 1, wherein generating the three-dimensional object includes generating a polygon for a particular segment of the two-dimensional profile and a particular segment of the two-dimensional floor plan.

14. The method of claim 13, wherein generating the three-dimensional object includes generating a polygon for each pairing of a segment of the two-dimensional profile and a segment of the two-dimensional floor plan.

15. The method of claim 13, wherein generating the polygon includes determining four vertices of the polygon respectively based on a first end of the particular segment of the two-dimensional profile and a first end of the particular segment of the two-dimensional floor plan, a second end of the particular segment of the two-dimensional profile and the first end of the particular segment of the two-dimensional floor plan, the first end of the particular segment of the two-dimensional profile and a second end of the particular segment of the two-dimensional floor plan, and the second end of the particular segment of the two-dimensional profile and the second end of the particular segment of the two-dimensional floor plan.

16. The method of claim 15, wherein determining the four vertices is based on a straight skeleton of the two-dimensional floor plan.

17. The method of claim 1, wherein generating the three-dimensional object includes generating three-dimensional sub-objects arranged at spaced locations of the two-dimensional floor plan.

18. The method of claim 1, wherein displaying the three-dimensional object includes displaying a computer-generated reality (CGR) environment and displaying the three-dimensional object in the CGR environment.

19. A non-transitory memory storing one or more programs, which, when executed by one or more processors of a device with one or more input devices and a display, cause the device to:
 detect, via the one or more input devices, a first set of one or more user inputs that specify a first segment of a two-dimensional profile and a second segment of the two-dimensional profile;
 detect, via the one or more input devices, a second set of one or more user inputs indicative of a shape of a two-dimensional floor plan;
 generate, based on the two-dimensional profile and the two-dimensional floor plan, a three-dimensional object, wherein the three-dimensional object includes:
  a first portion corresponding to the first segment of the two-dimensional profile, and
  a second portion corresponding to the second segment of the two-dimensional profile and the shape of the two-dimensional floor plan; and
 display, on the display, the three-dimensional object.

20. A device comprising:
 one or more input devices;
 a display;
 a non-transitory memory; and
 one or more processors to:
  detect, via the one or more input devices, a first set of one or more user inputs that specify a first segment of a two-dimensional profile and a second segment of the two-dimensional profile;
  detect, via the one or more input devices, a second set of one or more user inputs indicative of a shape of a two-dimensional floor plan;
  generate, based on the two-dimensional profile and the two-dimensional floor plan, a three-dimensional object, wherein the three-dimensional object includes:
   a first portion corresponding to the first segment of the two-dimensional profile, and
   a second portion corresponding to the second segment of the two-dimensional profile and the shape of the two-dimensional floor plan; and
  display, on the display, the three-dimensional object.

\* \* \* \* \*